United States Patent
Winterbottom

(10) Patent No.: US 12,217,056 B2
(45) Date of Patent: Feb. 4, 2025

(54) LOAD/STORE UNIT FOR A TENSOR ENGINE AND METHODS FOR LOADING OR STORING A TENSOR

(71) Applicant: Celestial AI Inc., Santa Clara, CA (US)

(72) Inventor: Philip Winterbottom, San Jose, CA (US)

(73) Assignee: Celestial AI Inc., Santa Clara, CA (US)

( * ) Notice: Subject to any disclaimer, the term of this patent is extended or adjusted under 35 U.S.C. 154(b) by 0 days.

(21) Appl. No.: 18/423,210

(22) Filed: Jan. 25, 2024

(65) Prior Publication Data

US 2024/0403046 A1    Dec. 5, 2024

Related U.S. Application Data

(60) Provisional application No. 63/441,689, filed on Jan. 27, 2023.

(51) Int. Cl.
G06F 9/30    (2018.01)

(52) U.S. Cl.
CPC ...... *G06F 9/30036* (2013.01); *G06F 9/30065* (2013.01); *G06F 9/3013* (2013.01)

(58) Field of Classification Search
None
See application file for complete search history.

(56) References Cited

U.S. PATENT DOCUMENTS

| | | | |
|---|---|---|---|
| 4,912,706 A | 3/1990 | Eisenberg et al. | |
| 4,934,775 A | 6/1990 | Koai | |
| 5,457,563 A | 10/1995 | Van Deventer | |
| 6,249,621 B1 | 6/2001 | Sargent et al. | |
| 6,714,552 B1 | 3/2004 | Cotter | |
| 7,034,641 B1 | 4/2006 | Clarke et al. | |
| 7,778,501 B2 | 8/2010 | Beausoleil et al. | |
| 7,889,996 B2 | 2/2011 | Zheng et al. | |

(Continued)

FOREIGN PATENT DOCUMENTS

| AU | 2019100030 A | 2/2019 |
|---|---|---|
| AU | 2019100679 A | 8/2019 |

(Continued)

OTHER PUBLICATIONS

Dakkak, A.D. et al., Accelerating Reduction and Scan Using Tensor Core Units, 2019,ACM,pp. 46-57. (Year: 2019).*

(Continued)

*Primary Examiner* — Eric Coleman
(74) *Attorney, Agent, or Firm* — Ray Quinney & Nebeker; James Bullough

(57) ABSTRACT

A method for processing a tensor is described including obtaining a first register for a number of items in the tensor. One or more second registers for a number of items in a first and a second axis of the tensor are obtained. A stride in the first and the second axis is obtained A next item in the tensor is obtained using the stride in the first axis and a first offset register, when the first register indicates the tensor has additional items to process and the second registers indicate the next item resides in the first axis. A next item in the tensor is obtained using the stride in the first axis and the second axis, the first offset register, and a second offset register. The first register and a second register is modified. The first and the second offset registers are modified.

20 Claims, 16 Drawing Sheets

(56) References Cited

U.S. PATENT DOCUMENTS

| | | |
|---|---|---|
| 7,894,699 B2 | 2/2011 | Beausoleil |
| 7,961,990 B2 | 6/2011 | Krishnamoorthy et al. |
| 8,064,739 B2 | 11/2011 | Binkert et al. |
| 8,213,751 B1 | 7/2012 | Ho et al. |
| 8,260,147 B2 | 9/2012 | Scandurra et al. |
| 8,285,140 B2 | 10/2012 | Mccracken et al. |
| 8,326,148 B2 | 12/2012 | Bergman et al. |
| 8,340,517 B2 | 12/2012 | Shacham et al. |
| 8,447,146 B2 | 5/2013 | Beausoleil et al. |
| 8,611,747 B1 | 12/2013 | Wach |
| 9,036,482 B2 | 5/2015 | Lea |
| 9,369,784 B2 | 6/2016 | Zid et al. |
| 9,495,295 B1 | 11/2016 | Dutt et al. |
| 9,791,761 B1 | 9/2017 | Li et al. |
| 9,831,360 B2 | 11/2017 | Knights et al. |
| 9,882,655 B2 | 1/2018 | Li et al. |
| 10,031,287 B1 | 7/2018 | Heroux et al. |
| 10,107,959 B2 | 10/2018 | Heroux et al. |
| 10,117,007 B2 | 10/2018 | Song et al. |
| 10,185,085 B2 | 1/2019 | Huangfu et al. |
| 10,225,632 B1 | 3/2019 | Dupuis et al. |
| 10,250,958 B2 | 4/2019 | Chen et al. |
| 10,281,747 B2 | 5/2019 | Padmaraju et al. |
| 10,365,445 B2 | 7/2019 | Badihi et al. |
| 10,564,512 B2 | 2/2020 | Sun et al. |
| 10,598,852 B1 | 3/2020 | Zhao et al. |
| 10,651,933 B1 | 5/2020 | Chiang et al. |
| 10,837,827 B2 | 11/2020 | Nahmias et al. |
| 10,908,369 B1 | 2/2021 | Mahdi et al. |
| 10,915,297 B1* | 2/2021 | Halutz .................. G06F 17/153 |
| 10,935,722 B1 | 3/2021 | Li et al. |
| 10,951,325 B1 | 3/2021 | Rathinasamy et al. |
| 10,962,728 B2 | 3/2021 | Nelson et al. |
| 10,976,491 B2 | 4/2021 | Coolbaugh et al. |
| 11,107,770 B1 | 8/2021 | Ramalingam et al. |
| 11,165,509 B1 | 11/2021 | Nagarajan et al. |
| 11,165,711 B2 | 11/2021 | Mehrvar et al. |
| 11,233,580 B2 | 1/2022 | Meade et al. |
| 11,321,092 B1* | 5/2022 | Raikin ................ G06F 9/30036 |
| 11,336,376 B1 | 5/2022 | Xie |
| 11,493,714 B1 | 11/2022 | Mendoza et al. |
| 11,500,153 B2 | 11/2022 | Meade et al. |
| 11,509,397 B2 | 11/2022 | Ma et al. |
| 11,769,710 B2 | 9/2023 | Refai-Ahmed et al. |
| 11,817,903 B2 | 11/2023 | Pleros et al. |
| 2004/0213229 A1 | 10/2004 | Chang et al. |
| 2006/0159387 A1 | 7/2006 | Handelman |
| 2006/0204247 A1 | 9/2006 | Murphy |
| 2011/0206379 A1 | 8/2011 | Budd |
| 2012/0020663 A1 | 1/2012 | McLaren |
| 2012/0251116 A1 | 10/2012 | Li et al. |
| 2013/0275703 A1 | 10/2013 | Schenfeld |
| 2013/0308942 A1 | 11/2013 | Ji et al. |
| 2015/0109024 A1 | 4/2015 | Abdelfattah et al. |
| 2015/0354938 A1 | 12/2015 | Mower et al. |
| 2016/0116688 A1 | 4/2016 | Hochberg et al. |
| 2016/0344507 A1 | 11/2016 | Marquardt et al. |
| 2017/0045697 A1 | 2/2017 | Hochberg et al. |
| 2017/0194309 A1 | 7/2017 | Evans et al. |
| 2017/0194310 A1 | 7/2017 | Evans et al. |
| 2017/0207600 A1 | 7/2017 | Klamkin et al. |
| 2017/0220352 A1* | 8/2017 | Woo .................. G06F 9/30065 |
| 2018/0107030 A1 | 4/2018 | Morton et al. |
| 2018/0260703 A1 | 9/2018 | Soljacic et al. |
| 2019/0026225 A1 | 1/2019 | Gu et al. |
| 2019/0049665 A1 | 2/2019 | Ma et al. |
| 2019/0205737 A1 | 7/2019 | Bleiweiss et al. |
| 2019/0265408 A1 | 8/2019 | Ji et al. |
| 2019/0266088 A1 | 8/2019 | Kumar |
| 2019/0266089 A1 | 8/2019 | Kumar |
| 2019/0294199 A1 | 9/2019 | Carolan et al. |
| 2019/0317285 A1 | 10/2019 | Liff |
| 2019/0317287 A1 | 10/2019 | Raghunathan et al. |
| 2019/0356394 A1 | 11/2019 | Bunandar et al. |
| 2019/0372589 A1 | 12/2019 | Gould |
| 2019/0385997 A1 | 12/2019 | Choi et al. |
| 2020/0006304 A1 | 1/2020 | Chang et al. |
| 2020/0125716 A1 | 4/2020 | Chittamuru et al. |
| 2020/0142441 A1 | 5/2020 | Bunandar et al. |
| 2020/0174707 A1* | 6/2020 | Johnson ............... G06F 12/0207 |
| 2020/0200987 A1 | 6/2020 | Kim |
| 2020/0213028 A1 | 7/2020 | Behringer et al. |
| 2020/0250532 A1 | 8/2020 | Shen et al. |
| 2020/0284981 A1 | 9/2020 | Harris et al. |
| 2020/0310761 A1* | 10/2020 | Rossi ..................... H03M 7/18 |
| 2020/0409001 A1 | 12/2020 | Liang et al. |
| 2020/0410330 A1* | 12/2020 | Liu ..................... G06F 9/38885 |
| 2021/0036783 A1 | 2/2021 | Bunandar et al. |
| 2021/0064958 A1 | 3/2021 | Lin et al. |
| 2021/0072784 A1 | 3/2021 | Lin et al. |
| 2021/0116637 A1 | 4/2021 | Li et al. |
| 2021/0132309 A1 | 5/2021 | Zhang et al. |
| 2021/0132650 A1 | 5/2021 | Wenhua et al. |
| 2021/0133547 A1 | 5/2021 | Wenhua et al. |
| 2021/0173238 A1 | 6/2021 | Hosseinzadeh |
| 2021/0257396 A1 | 8/2021 | Piggott et al. |
| 2021/0271020 A1 | 9/2021 | Islam et al. |
| 2021/0286129 A1 | 9/2021 | Fini et al. |
| 2021/0305127 A1 | 9/2021 | Refai-Ahmed et al. |
| 2021/0406164 A1* | 12/2021 | Grymel ............... G06F 12/0292 |
| 2021/0409848 A1 | 12/2021 | Saunders et al. |
| 2022/0003948 A1 | 1/2022 | Zhou et al. |
| 2022/0004029 A1 | 1/2022 | Meng |
| 2022/0012578 A1 | 1/2022 | Brady et al. |
| 2022/0012582 A1 | 1/2022 | Pleros et al. |
| 2022/0044092 A1 | 2/2022 | Pleros et al. |
| 2022/0091332 A1 | 3/2022 | Yoo et al. |
| 2022/0092016 A1 | 3/2022 | Kumashikar |
| 2022/0171142 A1 | 6/2022 | Wright et al. |
| 2022/0302033 A1 | 9/2022 | Cheah et al. |
| 2022/0342164 A1 | 10/2022 | Chen et al. |
| 2022/0374575 A1 | 11/2022 | Ramey et al. |
| 2022/0382005 A1 | 12/2022 | Rusu |
| 2023/0089415 A1 | 3/2023 | Zilkie et al. |
| 2023/0197699 A1 | 6/2023 | Spreitzer et al. |
| 2023/0251423 A1 | 8/2023 | Perez Lopez et al. |
| 2023/0258886 A1 | 8/2023 | Liao |
| 2023/0282547 A1 | 9/2023 | Refai-Ahmed et al. |
| 2023/0308188 A1 | 9/2023 | Dorta-Quinones |
| 2023/0314702 A1 | 10/2023 | Yu |
| 2023/0376818 A1 | 11/2023 | Nowak |
| 2023/0393357 A1 | 12/2023 | Ranno |

FOREIGN PATENT DOCUMENTS

| | | |
|---|---|---|
| AU | 2019100750 A | 8/2019 |
| CN | 102281478 A | 12/2011 |
| CN | 102333250 A | 1/2012 |
| CN | 102413039 A | 4/2012 |
| CN | 102638311 A | 8/2012 |
| CN | 102645706 A | 8/2012 |
| CN | 202522621 U | 11/2012 |
| CN | 103369415 A | 10/2013 |
| CN | 103442311 A | 12/2013 |
| CN | 103580890 A | 2/2014 |
| CN | 104539547 A | 4/2015 |
| CN | 105451103 A | 3/2016 |
| CN | 205354341 U | 6/2016 |
| CN | 105812063 A | 7/2016 |
| CN | 105847166 A | 8/2016 |
| CN | 106126471 A | 11/2016 |
| CN | 106331909 A | 1/2017 |
| CN | 106407154 A | 2/2017 |
| CN | 106533993 A | 3/2017 |
| CN | 106549874 A | 3/2017 |
| CN | 106796324 | 5/2017 |
| CN | 106888050 A | 6/2017 |
| CN | 106911521 A | 6/2017 |
| CN | 106936708 A | 7/2017 |
| CN | 106936736 A | 7/2017 |
| CN | 106980160 A | 7/2017 |
| CN | 107911761 A | 4/2018 |
| CN | 108599850 A | 9/2018 |
| CN | 207835452 U | 9/2018 |

(56) References Cited

FOREIGN PATENT DOCUMENTS

| | | |
|---|---|---|
| CN | 108737011 A | 11/2018 |
| CN | 110266585 A | 9/2019 |
| CN | 110505021 A | 11/2019 |
| CN | 111208690 A | 5/2020 |
| CN | 111752891 A | 10/2020 |
| CN | 111770019 A | 10/2020 |
| CN | 111786911 A | 10/2020 |
| FR | 3007537 A | 12/2014 |
| GB | 2223867 | 4/1990 |
| IN | 201621017235 A | 7/2016 |
| IN | 202121008267 A | 4/2021 |
| JP | 6747660 B | 8/2020 |
| JP | 2020155112 | 9/2020 |
| KR | 101242172 B | 3/2013 |
| KR | 101382606 B | 4/2014 |
| KR | 101465420 B | 11/2014 |
| KR | 101465498 B | 11/2014 |
| KR | 101541534 B | 8/2015 |
| KR | 101548695 B | 9/2015 |
| KR | 101766786 B | 8/2017 |
| KR | 101766792 B | 8/2017 |
| WO | WO2015176289 | 11/2015 |
| WO | WO2020072925 | 4/2020 |
| WO | WO2020102204 | 5/2020 |
| WO | WO2020191217 | 9/2020 |
| WO | WO2021021787 | 2/2021 |
| WO | WO2022032105 | 2/2022 |
| WO | WO2022133490 | 6/2022 |
| WO | WO2023177417 | 9/2022 |
| WO | WO2022266676 | 12/2022 |
| WO | WO2023177922 | 9/2023 |

OTHER PUBLICATIONS

U.S. Appl. No. 63/392,475, filed Jul. 26, 2022, Aggarwal et al.
U.S. Appl. No. 18/076,196, filed Dec. 6, 2022, Aggarwal et al.
U.S. Appl. No. 18/076,210, filed Dec. 6, 2022, Aggarwal et al.
U.S. Appl. No. 18/217,898, filed Jul. 3, 2023, Aggarwal et al.
U.S. Appl. No. 63/437,639, filed Jan. 6, 2023, Plunkett et al.
U.S. Appl. No. 63/437,641, filed Jan. 6, 2023, Plunkett et al.
Hendry, G. et al.; "Circuit-Switched Memory Access in Photonic Interconnection Networks for High-Performance Embedded Computing," SC '10: Proceedings of the 2010 ACM/IEEE International Conference for High Performance Computing, Networking, Storage and Analysis, New Orleans, LA, USA, 2010, pp. 1-12.
Liu, Jifeng, et al; "Waveguide-integrated, ultralow-energy GeSi electro-absorption modulators", Nature Photonics, [Online] vol. 2, No. 7, May 30, 2008 (May 30, 2008), pp. 433-437.
Wu, Longsheng et al.; "Design of a broadband Ge 1-20 1-x Six electro-absorption modulator based on the Franz-Keldysh effect with thermal tuning", Optics Express, [Online] vol. 28, No. 5, Feb. 27, 2020 (Feb. 27, 2020), p. 7585.
Zhang, Yulong; "Building blocks of a silicon photonic integrated wavelength division multiplexing transmitter for detector instrumentation" , Doktors Der Ingenieurwissenschaften (Dr.-Ing. ), Dec. 15, 2020 (Dec. 15, 2020), 128 pages.
U.S. Appl. No. 18/540,579, filed May 1, 2024, Office Action.
U.S. Appl. No. 17/807,692, filed Jul. 12, 2024, Office Action.
U.S. Appl. No. 18/407,408, filed Jul. 30, 2024, Notice of Allowance.
U.S. Appl. No. 18/407,410, filed May 24, 2024, Office Action.
U.S. Appl. No. 18/407,410, filed Aug. 12, 2024, Notice of Allowance.
U.S. Appl. No. 17/903,455, filed Jun. 27, 2024, Office Action.
U.S. Appl. No. 18/590,708, filed Aug. 7, 2024, Notice of Allowance.
PCT/US2023/015680, Aug. 9, 2024, International Preliminary Report on Patentability.
10-2023-7007856, Aug. 21, 2024, Foreign Notice of Allowance.
202180068303.5, Jul. 31, 2024, Foreign Notice of Allowance.
11202307570T, Apr. 10, 2024, Foreign Notice of Allowance.
202280020819.7, Apr. 4, 2024, Foreign Office Action.
202180093875.9, Apr. 12, 2024, Foreign Office Action.
PCT/US2024/010774, May 3, 2024, International Search Report and Written Opinion.
EP23220883, May 7, 2024, Extended European Search Report.
PCT/US2024/013168, May 8, 2024, International Search Report and Written Opinion.
22826043.6, Jun. 14, 2024, Extended European Search Report.
21853044.2, Jul. 23, 2024, Extended European Search Report.
1020237024129, Aug. 2, 2024, Foreign Office Action.
1020237044346, Aug. 27, 2024, Foreign Office Action.
U.S. Appl. No. 63/049,928, filed Jul. 9, 2020, Pleros et al.
U.S. Appl. No. 63/062,163, filed Aug. 6, 2020, Pleros et al.
U.S. Appl. No. 63/199,286, filed Dec. 17, 2020, Ma et al.
U.S. Appl. No. 63/199,412, filed Dec. 23, 2022, Ma et al.
U.S. Appl. No. 63/201,155, filed Apr. 15, 2021, Ma et al.
U.S. Appl. No. 63/261,974, filed Oct. 1, 2021, Pleros et al.
U.S. Appl. No. 63/212,353, filed Jun. 18, 2021, Winterbottom et al.
U.S. Appl. No. 17/807,692, filed Jun. 17, 2022, Winterbottom et al.
U.S. Appl. No. 17/807,694, filed Jun. 17, 2022, Winterbottom et al.
U.S. Appl. No. 17/807,698, filed Jun. 17, 2022, Winterbottom et al.
U.S. Appl. No. 17/807,699, filed Jun. 17, 2022, Winterbottom et al.
U.S. Appl. No. 17/807,695, filed Jun. 17, 2022, Winterbottom et al.
U.S. Appl. No. 63/321,453, filed Mar. 18, 2022, Bos et al.
U.S. Appl. No. 17/903,455, filed Sep. 6, 2022, Lazovsky et al.
U.S. Appl. No. 18/123,161, filed Mar. 17, 2023, Bos et al.
U.S. Appl. No. 17/957,731, filed Sep. 30, 2022, Pleros et al.
U.S. Appl. No. 17/957,812, filed Sep. 30, 2022, Pleros et al.
U.S. Appl. No. 63/420,323, filed Oct. 28, 2022, Sahni.
U.S. Appl. No. 18/123,170, filed Mar. 17, 2023, Sahni.
U.S. Appl. No. 63/420,330, filed Oct. 28, 2022, Sahni et al.
U.S. Appl. No. 63/428,663, filed Nov. 29, 2022, Sahni et al.
U.S. Appl. No. 63/441,689, filed Jan. 27, 2023, Winterbottom.
U.S. Appl. No. 63/579,486, filed Aug. 29, 2023, Aggarwal et al.
U.S. Appl. No. 63/535,509, filed Aug. 30, 2023, Winterbottom et al.
U.S. Appl. No. 63/535,511, filed Aug. 30, 2023, Winterbottom et al.
U.S. Appl. No. 63/535,512, filed Aug. 30, 2023, José Maia da Silva et al.
U.S. Appl. No. 63/592,509, filed Oct. 23, 2023, Aggarwal et al.
U.S. Appl. No. 63/592,517, filed Oct. 23, 2023, Winterbottom et al.
U.S. Appl. No. 18/473,898, filed Sep. 25, 2023, Pleros et al.
U.S. Appl. No. 18/523,667, filed Nov. 29, 2023, Sahni et al.
U.S. Appl. No. 18/293,673, filed Jan. 30, 2024, Bos et al.
U.S. Appl. No. 18/407,408, filed Jan. 8, 2024, Aggarwal.
U.S. Appl. No. 18/407,410, filed Jan. 8, 2024, Aggarwal.
U.S. Appl. No. 18/423,210, filed Jan. 25, 2024, Winterbottom.
U.S. Appl. No. 18/540,579, filed Dec. 14, 2023, Winterbottom et al.
U.S. Appl. No. 18/590,689, filed Feb. 28, 2024, Winterbottom et al.
U.S. Appl. No. 18/590,703, filed Feb. 28, 2024, Winterbottom et al.
U.S. Appl. No. 18/590,708, filed Feb. 28, 2024, Winterbottom et al.
Ardestani, et al., "Supporting Massive DLRM Inference Through Software Defined Memory", Nov. 8, 2021; 14 pages.
Agrawal, Govind; "Chapter 4—Optical Receivers", Fiber-Optic Communications Systems, John Wiley & Sons, Inc., (2002), pp. 133-182.
Burgwal, Roel et al; "Using an imperfect photonic network to implement random unitaries," Opt. Express 25(23), (2017), 28236-28245.
Capmany, Francoy et al.; "Thepgrammable processor" Nature Photonics, 109/22/20226, (2016), 5 pgs.
Carolan, Jacques et al.; "Universal Linear Optics"; arXiv: 1505.01182v1; (2015); 13 pgs.
Clements, William et al; "Optimal design for universal multiport interferometers"; Optica; vol. 3, No. 12; (2016), pp. 1460-1465.
Eltes, Felix et al.; "A BaTiO3-Based Electro-Optic Pockets Modulator Monolithically Integrated on an Advanced Silicon Photonics Platform"; J. Lightwave Technol. vol. 37, No. 5; (2019), pp. 1456-1462.
Eltes, Felix et al.; Low-Loss BaTiO3—Si Waveguides for Nonlinear Integrated Photonics'; ACS Photon., vol. 3, No. 9; (2016), pp. 1698-1703.
Harris, NC et al.; "Efficient, compact and low loss thermo-optic phase shifter in colicon"; Opt. Express, vol. 22, No. 9; (2014), pp. 10487-10493.

(56) References Cited

OTHER PUBLICATIONS

Jiang, W.; "Nonvolatile and ultra-low-loss reconfigurable mode (De) multiplexer/switch using triple-waveguide coupler with Ge2Sb2Se4T31 phase change material"; Sci. Rep. vol. 8, No. 1; (2018), 12 pages.

Lambrecht, Joris et al.; "90-GB/s NRZ Optical Receiveer in Silicon Using a Fully Differential Transimpedance Aplifier," Journal of Lightwave Technology, vol. 37, No. 9; (2019); pp. 1964-1973.

Manolis, A. et al; "Non-volatile integrated photonic memory using GST phase change material on a fully eched Si3N4/SiO2 waveguide"; Conference on Lasers and Electro-optics; OSA Technical Digest, paper STh3R.4; (2020); 2 pages.

Miller, David A. et al; "Perfect optics with imperfect components"; Optica, vol. 2, No. 8; (2015); pp. 747-750.

Miller, David A. et al; "Self-Configuring Universal Linear Optical Component"; Photon. Res. 1; [Online]; Retrieved from the interent: URL: https://arxiv.org/ftp/arxiv/papers/1303/1303.4602.pdf; (2013), pp. 1-15.

Miscuglio, Mario et al.; "Photonic Tensor cores for machine learning"; Applied Physics Reviews, vol. 7, Issue 3; (2020), 16 pages.

Mourgias-Alexandris, George et al; "An all-optical neuron with sigmoid activation function;" Optics Express, vol. 27, No. 7; (2019); pp. 9620-9630.

Mourgias-Alexandris, George et al; Neuromorphic Photonics with Coherent Linear Neurons Using Dual-IQ Modulation Cells, Journal of Lightwave Technology, vol. 38, No. 4; Feb. 15, 2020, pp. 811-819.

Pai, Sunil et al.; "Parallel Programming of an Arbitrary Feedforward Photonic Network"; IEEE Journal of Selected Topics in Quantum Electronics, vol. 26, No. 5; (2020), 13 pages.

Perez, Daniel et al. "Reconfigurable lattice mesh designs for prgrammable photonic processors"; Optics Express vol. 24, Issue 11; (2016); pp. 12093-12106.

Raj, Mayank et al.; "Design of a 50-GB/s Hybid Integrated Si-Photonic Optical Link in 16-nm FinFET"; IEEE Journal of Solid-State Circuits, vol. 55, No. 4, Apr. 2020, pp. 1086-1095.

Reck, M. et al; "Experimental Realization of any Discrete Unitary Operator"; Phys. Rev. Lett. 73; (1994); pp. 58-61.

Shen, Yichen et al; "Deep learning with coherent nanophotonic circuits"; https://arxiv.org/pdf/1610.02365.pdf; (2016); 8 pages.

Shi, Bin et al.; Numerical Simulation of an InP Photonic Integrated Cross-Connect for Deep Neural Networks on Chip; Applied Sciences, Jan. 9, 2020, pp. 1-15.

Shokraneh, Farhad et al; "The diamond mesh, a phase-error-and loss-tolerant fieldprogrammable MZI-based optical processor for optical neural networks" Opt. Express, vol. 28, No. 16; (2020); pp. 23495-23508.

Sun, Chen et al; "A 45 nm cmos-soi monolithic photonics platform with bit-statistics-based resonant microring thermal tuning"; IEEE Journal of Solid-State Circuits, vol. 51, No. 4; (2016); 20 pages.

Tait, Alexander et al; "Broadcast and Weight: an Intergated Network for Scalable Photonic Spike Processing"; Journal of Lightwave Technology, vol. 32, No. 21; (2014); pp. 4029-4041.

Yang, Lin et al; "On-chip CMOS-compatible optical signal processor"; Opt. Express, vol. 20, No. 12; (2012) pp. 13560-13565.

Zhuang, L. et al; Programmable photonic signal processor chip for radiofrequency applications; Optica 2; 854-859; (2015); 10 pages.

U.S. Appl. No. 17/395,849, filed Jan. 5, 2023, Office Action.
U.S. Appl. No. 17/395,849, filed Jul. 24, 2023, Notice of Allowance.
U.S. Appl. No. 17/645,001, filed Jul. 20, 2022, Notice of Allowance.
U.S. Appl. No. 18/540,579, Feb. 14, 2024, Office Action.
U.S. Appl. No. 17/807,692, Feb. 15, 2024, Restriction Requirement.
U.S. Appl. No. 18/407,408, filed Mar. 28, 2024, Office Action.
U.S. Appl. No. 18/407,410, filed Mar. 15, 2024, Restriction Requirement.
PCT/US2021/044956, Nov. 19, 2021, ISR.
PCT/US2021/073003, Mar. 22, 2022, ISR.
PCT/US2022/073039, Sep. 1, 2022, Invitation to Pay Additional Fees.
PCT/US2022/073039, Dec. 2, 2022, International Search Report and Written Opinion.
PCT/US2022/042621. Feb. 15, 2023, International Search Report and Written Opinion.
PCT/US2023/015680, May 23, 2023, Invitation to Pay Additional Fees.
PCT/US2023/015680, Aug. 23, 2023, International Search Report and Written Opinion.
20220404544, Jan. 19, 2024, Foreign Office Action.
202180068303.5, Jan. 20, 2024, Foreign Office Action.
PCT/US2022/042621, Feb. 26, 2024, International Preliminary Report on Patentability.
2023-537068, Oct. 1, 2024, Foreign Office Action.
11202304676X, Oct. 4, 2024, Foreign Notice of Allowance.

\* cited by examiner

LOAD/STORE UNIT FOR A TENSOR ENGINE AND METHODS FOR LOADING OR STORING A TENSOR

CROSS REFERENCE TO RELATED APPLICATIONS

The present application claims priority to and the benefit of U.S. Provisional Patent Application No. 63/441,689, filed Jan. 27, 2023, which incorporates by reference, in its entirety, U.S. patent application Ser. No. 17/807,694, entitled MULTI-CHIP ELECTRO-PHOTONIC NETWORK, filed on Jun. 17, 2022.

BACKGROUND

Applications like machine learning (ML), deep learning (DL), natural language processing (NLP), and machine vision (MV) are becoming more complex over time and being developed to handle more sophisticated tasks. Computing devices, however, have not advanced at a pace where they can effectively handle the needs of these new applications. Without sufficiently advanced computing paradigms, ML, DL, NLP, and MV applications, for example, cannot reach their full potential.

A tensor engine is a specialized processor in an ASIC that has the capability to make a computer more effective at handling ML, DL, NLP, and MV applications. The tensor engine is an AI accelerator specifically designed for neural network machine learning, and can be utilized via TensorFlow software, for example. Tensor engines typically implement the linear algebra needed to process an inference using a model in the neural network. In the above implementation, the tensor engine performs the operations that are not handled by a DNN (such as convolutions).

Tensor engines usually receive multi-dimensional arrays from memory with the data to perform the linear algebra upon. The tensor engine needs to execute a nested loop structure to process the multi-dimensional arrays. This computation is very expensive since it involves pointers, loop variables, and multiplication operations. The number of instructions needed to implement nested loops in tensor engines makes them inadequate for high performance computing applications.

SUMMARY

One embodiment is a method for processing a tensor. The method comprises obtaining a first register for a number of items in the tensor, obtaining one or more second registers for a number of items in a first and a second axis of the tensor, obtaining a stride in the first and the second axis, obtaining a next item in the tensor using the stride in the first axis and a first offset register, when the first register indicates the tensor has additional items to process and the second registers indicate the next item resides in the first axis, obtaining a next item in the tensor using the stride in the first axis and the second axis, the first offset register, and a second offset register, when the first register indicates the tensor has additional items to process, and the second registers indicate the next item resides in the second axis of the tensor, modifying the first register and one or more of the second registers, and modifying at least one of the first and the second offset registers.

Another embodiment is a load/store unit (LDSU) for a tensor engine. The LDSU comprises a first register for storing values associated with a number of items in a tensor, a plurality of second registers for storing a number of items in a first and a second axis of the tensor, a plurality of offset registers associated with the first and the second axis, a first and a second stride register associated with the first and the second axis, a tensor walking module configured to obtain a next item in the tensor using a first stride register and a first offset register, when the first register indicates the tensor has additional items to process and the second registers indicate the next item resides in the first axis of the tensor, the tensor walking module further configured to obtain a next item in the tensor using the first and the second stride registers, the first offset register, and a second offset register, when the first register indicates the tensor has additional items to process, and the second registers indicate the next item resides in the second axis of the tensor, an iteration tracking module configured to modify the first and the second registers, and a striding module configured to modify at least one of the first offset register or the second offset register.

DETAILED DESCRIPTION

Figure 1:
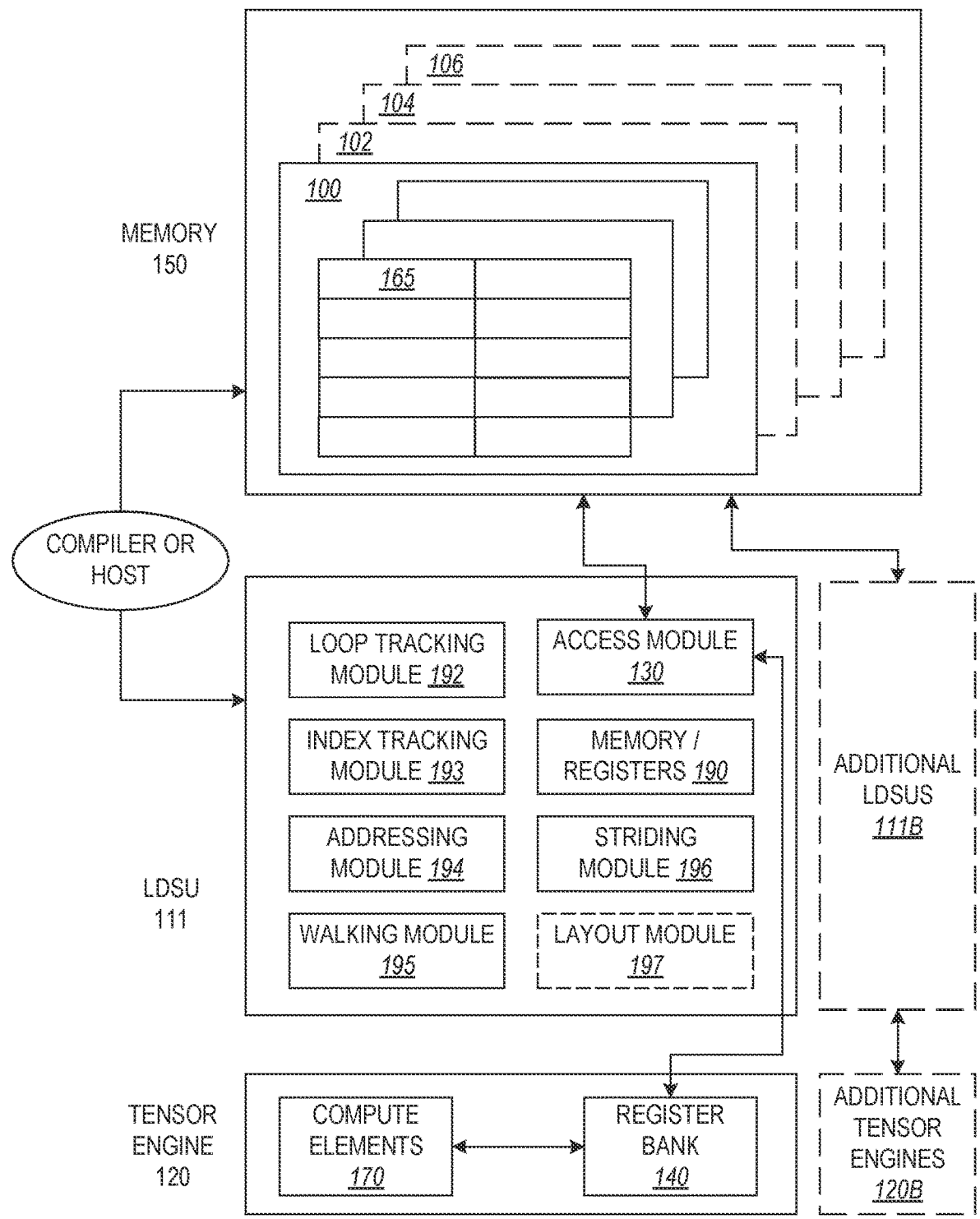
FIG. 1 is a block diagram of a tensor engine with a load/store unit (LDSU) according to one embodiment.

The present application discloses a load/store unit (LDSU) as well as example machine-learning (ML) accelerators that can take advantage of the benefits provided by the LDSU. In some embodiments, the LDSU is configured for operation with a tensor engine. The following description contains specific information pertaining to implementations in the present disclosure. The Figures in the present application and their accompanying Detailed Description are directed to merely example implementations. Unless noted otherwise, like or corresponding elements among the Figures may be indicated by like or corresponding reference numerals. Moreover, the Figures in the present application are generally not to scale and are not intended to correspond to actual relative dimensions.

Referring to FIG. 1, a memory 150 can have a plurality of tensors 100, 102, 104, and 106. A tensor is an n-dimensional array of items, where each of the items are of a primitive data type 165. Each of the tensors 100-106 can have a different number of dimensions and/or primitive data types 165. The primitive data type 165 can vary depending on the system that processes tensors 100-106 and the type of tensors. The primitive data type 165 can also be hard coded into a system that only processes a certain type of tensor with a fixed data type. In some embodiments, primitive data type 165 (e.g., item type) can include, but is not limited to, various bit lengths representing integers, floating point numbers, or boolean values. Examples include bits, bytes, integers, words, boolean values, (brain floating-point) BF-16, or FP-32, and the like.

Tensor engine 120 includes register bank 140 and compute elements 170. Compute elements 170 are configured to perform one or more mathematical operations on the data obtained from register bank 140 and optionally write the results back to register bank 140. LDSU 111 includes an access module 130. In operation, the LDSU 111 uses the access module 130 to read the tensor 100 from the memory 150 and to write the tensor 100 to the register bank 140. Alternatively, although not shown explicitly in FIG. 1, the LDSU 111 uses the access module 130 to read the tensor 100 from the register bank 140 and to write the tensor 100 to the memory 150.

LDSU 111 includes a loop tracking module 192 (e.g., an iteration tracking module), an index tracking module 193, an addressing module 194, a walking module 195, a striding module 196, and a layout module 197. The modules 192-197 can be implemented in hardware, software, firmware, or any applicable combination of these elements. The tensor 100 can be obtained by walking through each data element of data type 165 in the tensor 100 using one or more of the modules 192-197. LDSU 111 walks through tensor 100 using a memory 190 which can be loaded in advance of the processing tensor 100, either from a compiler, a host, or any applicable form of input capable of setting up memory 190 in advance of execution. The memory can be updated when each item from tensor 100 is accessed by the LDSU 111. In one embodiment, when the LDSU 111 is moved to the next position in tensor 100 an effective address (e.g., in a memory region) for the next item is computed which can be used by the access module 130 to read the next item from memory 150 or register bank 140.

Memory 190 can include one or more registers. At least some of the registers correspond to a first counter for the number of items in tensor 100 and a second counter for the number of items in each of a plurality of dimensions of tensor 100 (e.g., the size of the arrays for C, H, and W). In one embodiment, the first counter is set to the number of items in tensor 100 and for each step, the counter is decremented until it reaches zero, at which time the system knows it has reached the end of tensor 100. Other implementations for the first counter are possible as well. The second counter can be set as indices for each dimension of tensor 100, such that for each step the second counter can be used to determine whether the next step in tensor 100 is in the current dimension, or whether the last item in the current dimension has been reached and the next stride is in the next axis of tensor 100 that needs to be traversed. In one embodiment, the first counter can be determined by taking the indices for each dimension representing the number of items in each dimension and taking the product of all of the values.

The loop tracking module 192 can access one or more registers to determine when the end of the tensor has been reached. The index tracking module 193 can access one or more registers for each dimension of the tensor to determine if it is the end of the tensor or the last element in a dimension. After the LDSU 111 moves to the next item, the loop tracking module 192 and the index tracking module 193 update, decrement, increment, and/or otherwise modify the registers.

Addressing module 194 can be used to determine the effective address for the next item in the tensor each time LDSU 111 moves to the next item. In the embodiment where memory 150 has a plurality of registers, the addressing module 194 uses a base register and one or more offset registers to provide the effective address (e.g., in a memory region) to the access module 130. The base register can have a value that corresponds to the memory location (e.g., memory region) where the first bit of the first item in the tensor resides, either in memory 150 or register bank 140.

Striding module 196 can be used to determine the stride in each of the dimensions of tensor 100. The stride values can be stored in memory 190 in a stride register for each dimension, for example. In one embodiment, a compiler, host, or other process loads the stride registers in advance of processing a tensor. At each step in the processing of the tensor, the striding module 196 updates the appropriate stride registers to correspond to the next position of the LDSU 111.

Walking module 195 can be used to move the LDSU 111 to the next item in tensor 100 so that the access module 130 can obtain (load or store) the next item from either memory 150 or register bank 140. In one embodiment, memory 190 includes a plurality of offset registers, at least one for each dimension of tensor 100. To obtain the next item in tensor 100 and/or to move the LDSU 111 to the next position, the current values in the offset registers are added together. In one embodiment, additional LDSUs 111B and additional tensor engines 120B are used such that each of tensors 102, 104, and 106 have their own LDSU and tensor engine that can operate in parallel with LDSU 111 and tensor engine 120. In one embodiment, an optional layout module 197 is used which makes the manner and/or order in which tensor walking module 195 walks through tensor 100 configurable. The order can be set at compile time in advance of the processing tensor 100, either from a compiler, a host, or any applicable form of input capable of setting up memory 190 and/or providing input and output to the layout module 197. In embodiments where registers are used for each dimension of the tensor, the registers can form a 2-dimensional array where the layout module 155 selects each row for processing in the order specified by the layout and the tensor is processed accordingly.

Figure 2:
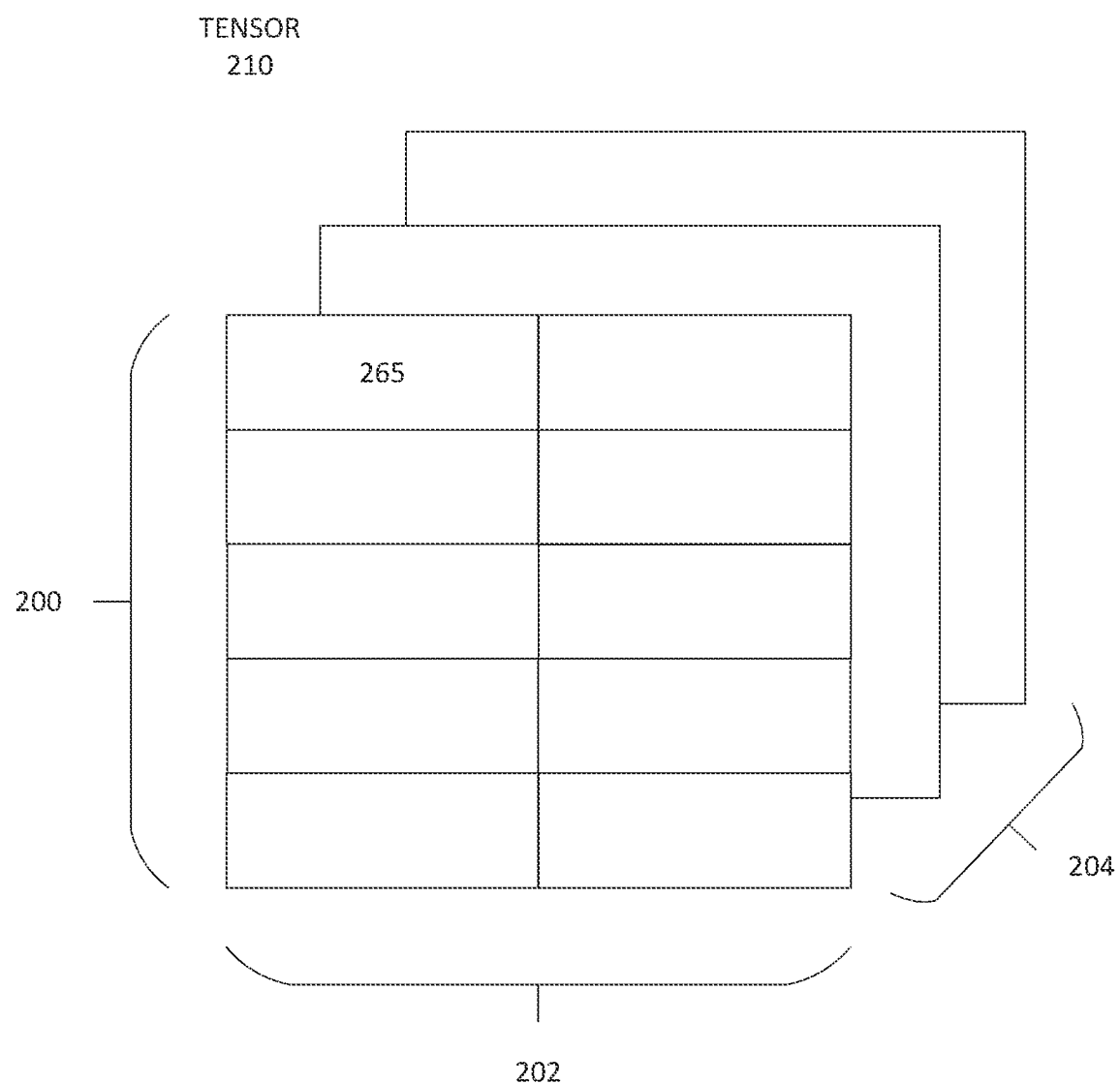
FIG. 2 is a diagram that illustrates a prior art three-dimensional tensor walking process according to one embodiment.

FIG. 2 is a diagram that illustrates a prior art three-dimensional tensor walking process. Tensor 210 is shown as being three-dimensional having dimensions of height (H) 200, width (W) 202, and depth (C) 204, also called channel. Tensor 210 is made up of elements of primitive data type 265. Tensor 210 is shown as having a height of 5, a width of 2, and a channel size of 5. In other examples, any number of height, width, and channel sizes can be used as well as an arbitrary number of dimensions. To walk the 3-dimensional tensor 210 using a prior art scheme, three nested loops are required. For example, the following pseudo-code could be applied to tensor 210, if processed in C, H, W order.

```
for (C=0; C<5; C++);
{
    for (H=0; H<5; H++);
    {
        for (W=0; W<2; W++);
        {
            // find effective address
            // load or store next item of tensor 210;
        }
    }
}
```

Using three nested loops to process tensor 210 is inefficient for use in an ML accelerator. The computation to find the effective address occurs at every step of the loop as well as pointer math with array indices. The size and amount of tensors that are typically processed coupled with the number of inefficient operations makes the prior art tensor engine of FIG. 2 inadequate for modern applications such as DLRM, machine vision, and the like. As will be understood by someone having ordinary skill in the art, and in the subsequent description, various embodiments the use LDSUs are capable of processing n-dimensional tensors without any nested loop structure and the associated drawbacks therewith.

Figure 3:
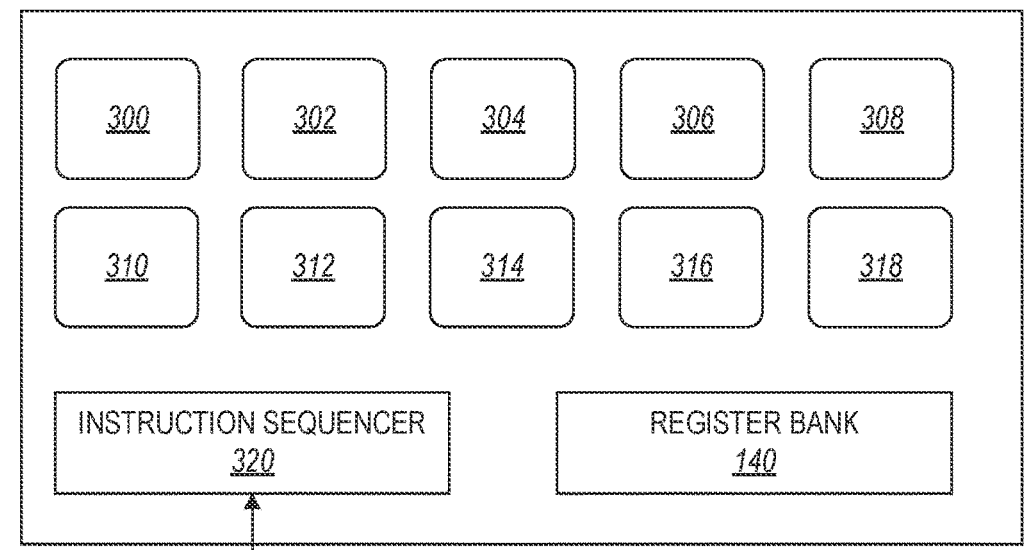
FIG. 3 is a top-view of a tensor engine with an LDSU according to one embodiment.

FIG. 3 shows an overview of one implementation of a tensor engine 120 with an LDSU 111. Each tensor engine in a system may be assigned to perform a portion of, for example, inference calculations for the specific machine learning model being used by an ML processor. Tensor engines in different nodes (not shown) in an ML processor can perform the machine learning tasks in parallel or in sequence. Machine learning computations of ML processor may be performed in one or more tensor engines, forming a data flow between the LDSUs and the tensor engines. Various implementations for the tensor engine 120 can be used without departing from the scope of the present application. The current embodiment includes LDSU 111, an instruction sequencer 320, a register bank 140, and compute elements 300, 302, 304, 306, 308, 310, 312, 314, 316, and 318. Other embodiments can have other configurations and can have any number of compute elements.

Figure 4:
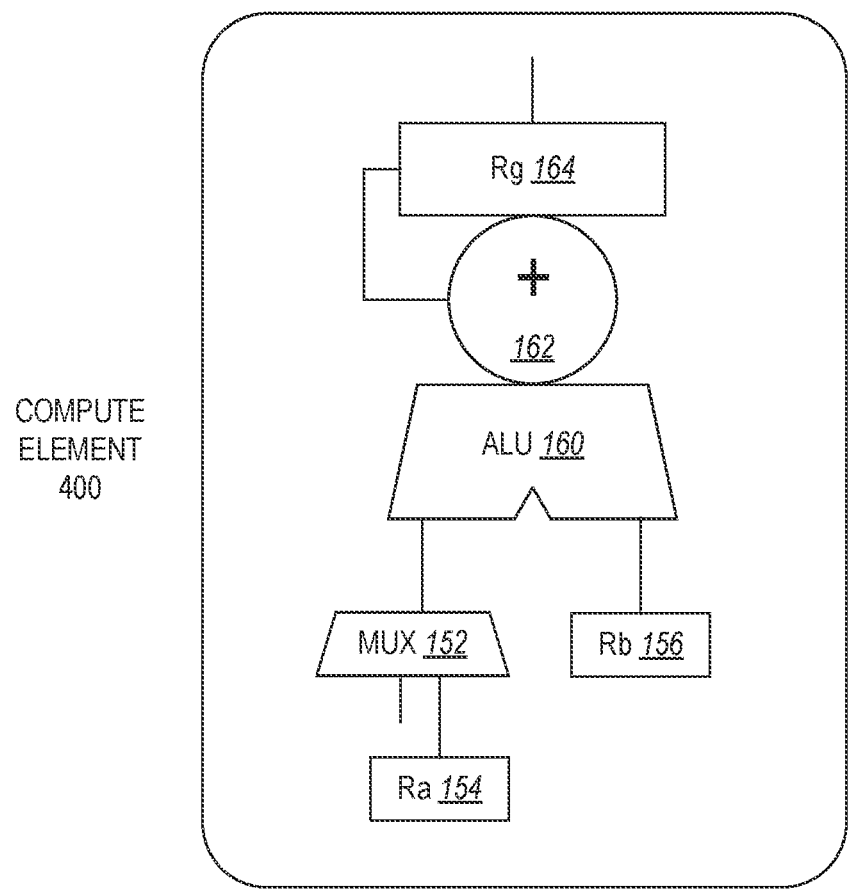
FIG. 4 is a top-view of a compute element that can be used in a tensor engine with an LDSU according to one embodiment

One example of a compute element 400 is shown in FIG. 4. FIG. 4 can correspond to the structure of compute elements 300-318 not specifically shown in FIG. 3, although that is not required. Compute element 400 includes multiplexers 152, Ra registers 154, Rb registers 156, arithmetic logic units (ALUs) 160, adders 162, and Rg registers 164. Tensor engine 120 uses instruction sequencer 320 to perform register write, accumulate, and register read operations in a manner known in the art. For example, tensor engine 120 may write two values to registers Ra 154 and Rb 156, accumulate them with the aid of ALU 160, and save the result in register Rg 164. Thereafter two more values are written into registers Ra 154 and Rb 156, are accumulated with the aid of ALU 160, read from ALU 160 and added to the previous content in register Rg 164 and written into register Rg 164. This routine may repeat again, for example, up to 32 times to generate a 32-bit output from each output register of the tensor engine 120. In one embodiment, tensor engine 120 is a single-instruction, multiple data processor using an instruction set purpose-designed for execution of machine learning algorithms.

Figure 5:
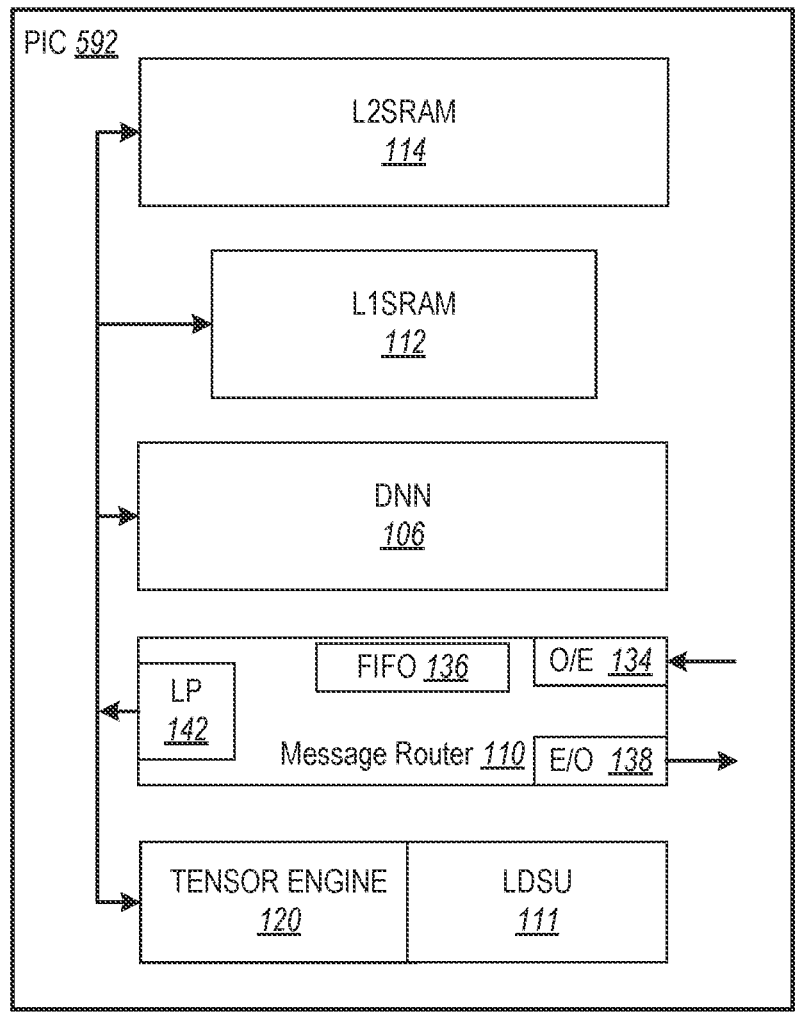
FIG. 5 is a top-view of a node with a tensor engine with an LDSU that resides in an ML accelerator according to one embodiment.

Referring now to FIG. 5, a top-view of a node 504 that resides in ML accelerator 500 is shown according to one embodiment. In one implementation, DNN 106 is implemented in electronic form and resides within an ASIC 588. DNN 106 can perform, for example, multiply-accumulate operations to execute either a convolution function or a dot product function as required by neural networks of the ML accelerator 500. The node 504 includes an LDSU 111, tensor engine 120, message router 110, level one static random-access memory (L1SRAM) 112, and level two static random-access memory (L2SRAM) 114. L1SRAM 112 can serve as scratchpad memory for each node 504, while L2SRAM 114 functions as the primary memory for each node and stores the weights of a machine learning model in close physical proximity to DNN 106 and tensor engine 120, and also stores any intermediate results required to execute the machine learning model. In one implementation, the L1SRAM 112 is optional. Weights are used in each layer of a neural network within each ML processor in, for example, inference calculations, each layer being typically implemented by several nodes in ML processor.

Activations from an originating node in ML processor or from an originating node in another ML processor in the ML accelerator 500 are streamed into a destination node in the ML processor. DNN 106 and tensor engine 120 perform computations on the streamed activations using the weights stored in L2SRAM 114. By pre-loading weights into L2SRAM 114 of each node 504, ML models (also referred to as execution graphs) are pre-loaded in each ML processor of the ML accelerator 500.

In general, a machine learning model is distributed onto one or more nodes where each node might execute several neurons. In the embodiment of FIG. 5, activations flowing between neurons in the same node are exchanged via memory whereas activations that move between nodes can utilize PIC 592 and be placed in the memory of the destination node. Input activations stream to nodes that are allocated to each neuron of the ML model (or each node of execution graph). Output activations, (i.e., results of computations using input activations and the pre-loaded weights), are transmitted in part using PIC 592 to the next node in the same ML processor or another ML processor.

In the implementation of FIG. 5, although not required for other embodiments, a message containing the packet data arrives through a photonic network situated on the PIC 592 and is received at the optical/electrical interface 134, which can be for example a photo diode and related circuit. The message can then be buffered in electronic form in a register such as FIFO 136 ("first in first out" register). An address contained in the message header is then examined by electronic message router 110, and the electronic message router determines which port and which destination the message should be routed to. For example, the message can be routed to a destination tile through electrical/optical interface 138, which can be for example a driver for an optical modulator. Examples of applicable modulator technology include EAM ("electro-absorptive modulator" or "electro-absorption modulator"), MZI ("Mach Zender Interferometer"), Ring modulator, and QCSE EAM ("Quantum Confined Stark Effect electro-absorptive modulator"). In this example, the message is routed to the destination determined by electronic message router 110 using an optical path situated on the PIC 592. As another example, the electronic message router 110 may determine that the destination of the message is L1SRAM 112, L2SRAM 114, DNN 106 or tensor engine 120. In that case, the message would be routed to local port 142.

Figure 6:
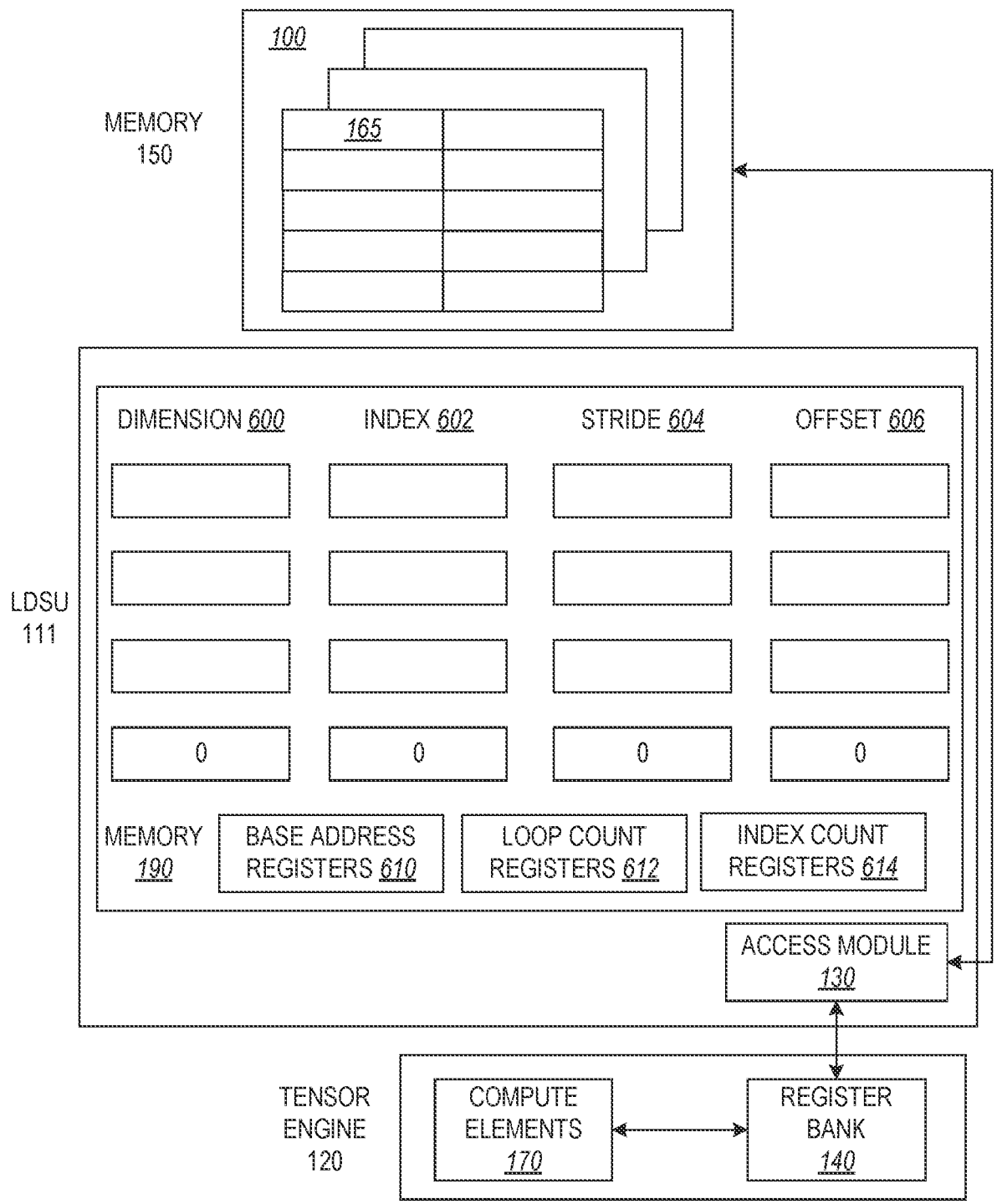
FIG. 6 is a block diagram illustrating details of the operation of an LDSU according to one embodiment.

FIGS. 6-11 are block diagrams illustrating details of the operation of an LDSU according to one embodiment. Referring to FIG. 6, LDSU 111 includes a memory 190. The memory includes registers for dimension 600, index 602, stride 604, and offset 606. In the current embodiment, each column of registers 600-606 has four rows. Any number of rows can be used. In the current embodiment, tensor 100 has three dimensions so only 3 rows of registers 600-606 are needed, so the fourth row of registers is loaded with zeroes and remains in that state while tensor 100 is being processed. If subsequently a 4-dimensional tensor was processed, then the fourth row of the registers could be used. In addition, memory 190 also has a base address register 610. The value loaded into the base address register 610 corresponds to the memory address in memory 150, which is the first bit of the first item of tensor 100. Memory 190 also includes an item counting register 612 and an index counting register 614. In the current embodiment, the item counter 612 is loaded with the product of the size of the three dimensions in the tensor, in this case (2×5×3). The item counter can be decremented whenever the LDSU 111 moves to the next item, for example, in order to track when the last item of tensor 100 is reached. The index counting register 614 is associated with the index column of registers 602. The index counting register 614 can be modified whenever the LDSU 111 moves to the next item and compared to the size of the current dimension, for example, in order to track when the next stride needs to account for the stride in the next axis of the tensor that is to be traversed.

Figure 7:
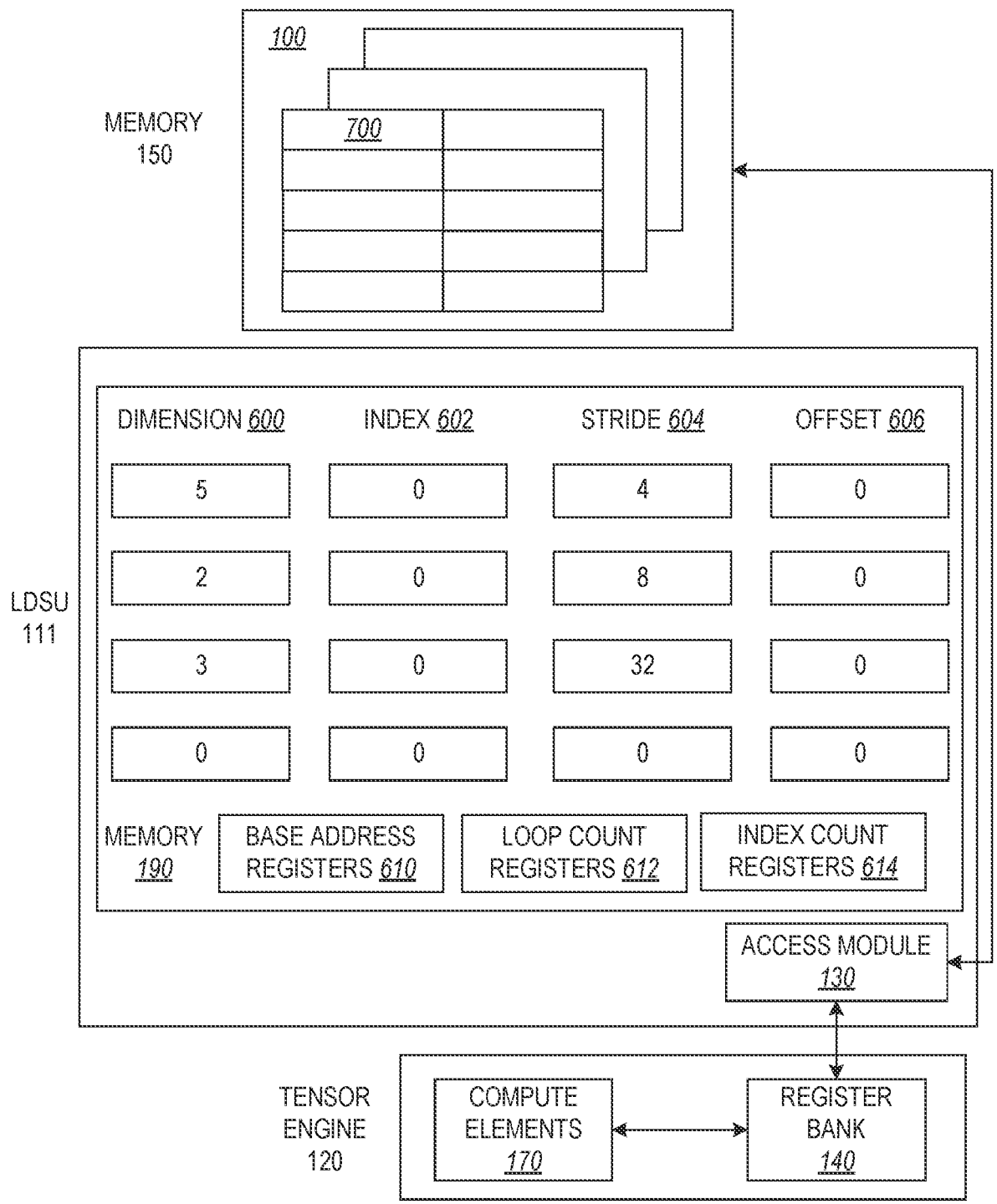
FIG. 7 is a block diagram illustrating details of the operation of an LDSU according to one embodiment.

Referring now to FIG. 7, the dimension column of registers 600 is loaded with values from a compiler or host. The values represent the number of items in each axis of tensor 100. In the current embodiment, tensor 100 has a height of 5, a width of 2, and a channel dimension of 3. A first item counting register 612 can be set to the product of each value in the dimension column of registers 600. In one embodiment, the product of these values can be stored in the loop counter register 612 and decremented each time the LDSU 111 is moved to the next position. The index column of registers 602 is set to zero and the offset registers 606 are also set to zero. This results in a first item of the tensor 700 being fetched in memory 150 at the address corresponding to the value stored in the base address register 610 of the memory 190 or otherwise determined by the addressing module 194. Typically, the value in the base address register is a number that corresponds to a memory address in memory 150 (e.g., in a memory region) and the initial item in tensor 100 starts at this memory address. Thus, access module 130 can fetch the first item using only the value in the base address register and loading the item at the memory location corresponding to that value. The stride column of registers 604 is loaded with the stride values to allow the next portion of tensor 100 to be fetched in the next iteration shown in FIG. 8.

Figure 8:
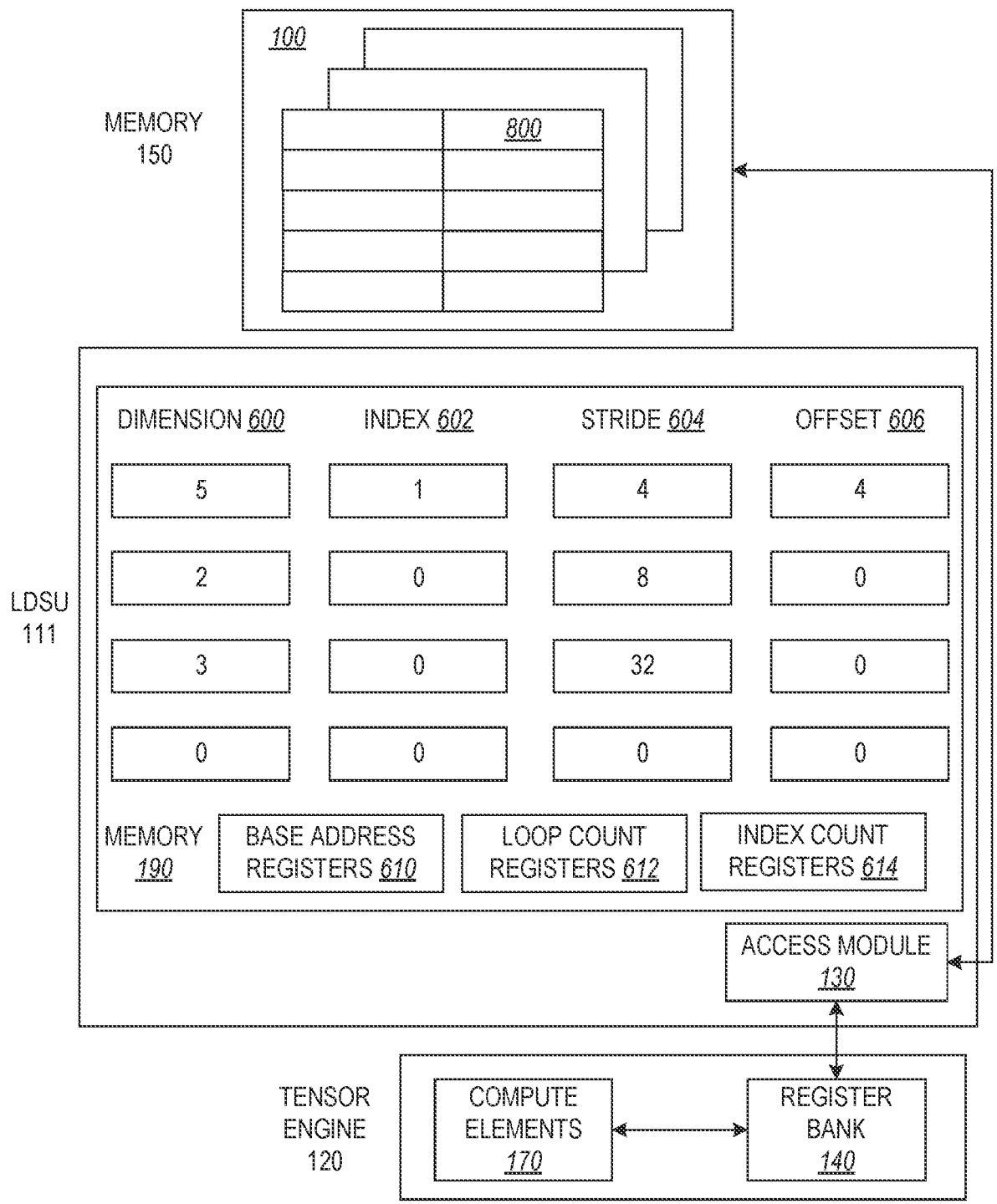
FIG. 8 is a block diagram illustrating details of the operation of an LDSU according to one embodiment.

FIG. 8 shows how memory 190 is modified in order to move LDSU 111 to the next position so item 800 can be obtained, loaded, stored, read, written, and/or otherwise accessed in memory 150 or register bank 140. At this step, the index tracking module 193 can set the first row of the index column of register to 1. The striding module 196 is called which sets the first-row register in the offset column 606 to 4. This can cause tensor walking module 195 to move the LDSU 111 to the next position corresponding to the new offset value in the first row of the offset column of registers 606. Thereafter, an effective address can be obtained by the addressing module 194 using the new offset value in the first row of the offset column of registers 606 and adding it to the value in the base address register yielding the location of the first bit of item 800 in the memory 150. Thereafter, the loop count registers 612 can be modified, for example by the loop tracking module 192, so the system can track when the last item of the tensor 100 has been reached. This operation can occur, for example, each time a next item in tensor 100 is obtained and/or each time the LDSU 111 is moved to a next position.

Figure 9:
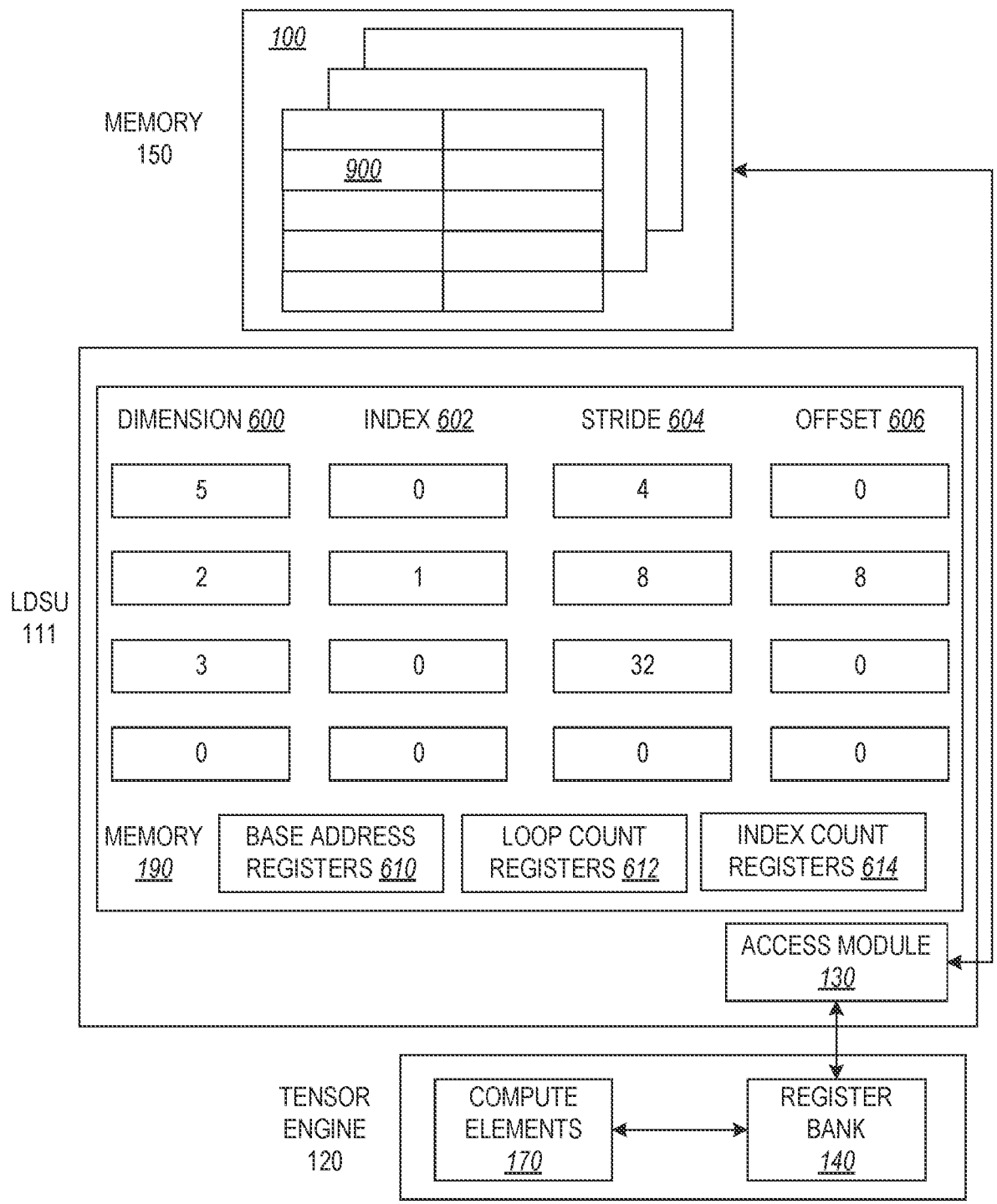
FIG. 9 is a block diagram illustrating details of the operation of an LDSU according to one embodiment.

FIG. 9 shows how memory 190 is modified in order to move LDSU 111 to the next position so item 900 can be obtained, loaded, stored, read, written, and/or otherwise accessed in memory 150 or register bank 140. At this step, the index tracking module 193 can set the second row of the index column of registers 602 to 1 and the first row of the index column of registers 602 to 0. The striding module 196 is called which sets the second-row register in the offset column 606 to 8 and the first-row register in the offset column 606 to 0. This can cause tensor walking module 195 to move the LDSU 111 to the next position corresponding to the new offset value (which is obtained by adding the values in the first-row and second-row registers of the offset column of registers 606. Thereafter, an effective address can be obtained by the addressing module 194 using the new offset value in the first and second rows of the offset column of registers 606 and adding it to the value in the base address register yielding the location of the first bit of item 900 in the memory 150. In operation, a second counting module or counter, such as index counting register 614 can be used to determine when a last item in any given dimension of tensor 100 is reached. For example, in FIG. 9, the second counter can be used to ensure that the dimension value in any of the registers in the dimension column of registers 600 is always larger than the index value in any of the registers in the index column of registers 602 in the same row. Once the index value equals the dimension value in the registers, the system determines that the last item in the dimension has been reached. In response, the index for the current dimension is modified and/or set to zero and the next dimension or row in the index column or registers 602 is incremented. Moreover, the stride in the next dimension is determined such that the stride for the next item 900 accounts for the stride in the next dimension.

Figure 10:
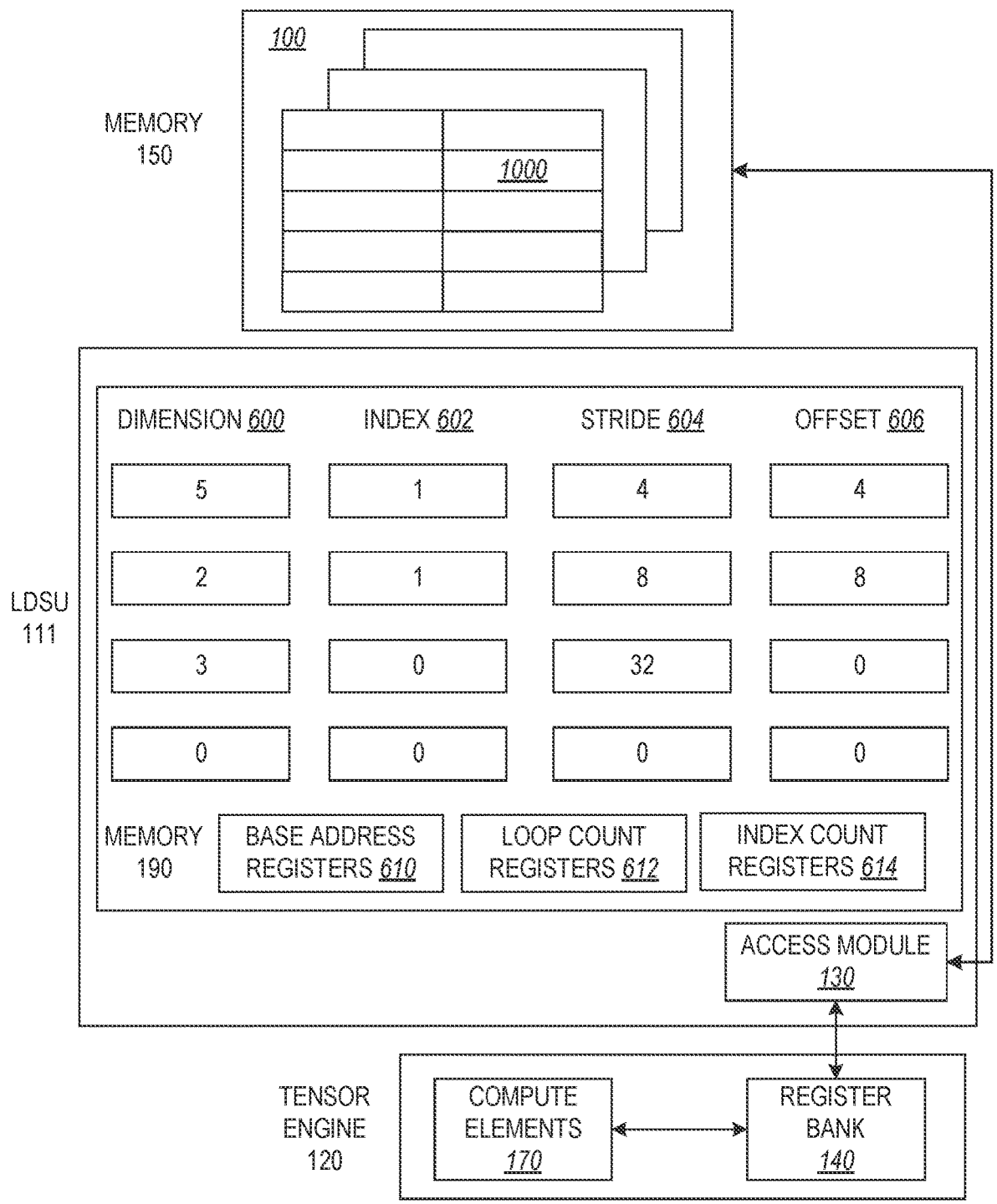
FIG. 10 is a block diagram illustrating details of the operation of an LDSU according to one embodiment.

FIG. 10 shows how memory 190 is modified in order to move LDSU 111 to the next position so item 1000 can be obtained, loaded, stored, read, written, and/or otherwise accessed in memory 150 or register bank 140. At this step, index tracking module 193 can set the first row of the index column of registers 602 to 1. The striding module 196 is called which sets the first-row register in the offset column 606 to 4. This can cause tensor walking module 195 to move the LDSU 111 to the next position corresponding to the new offset value (which is obtained by adding the values in the first-row and second-row registers of the offset column of registers 606). Thereafter, an effective address can be obtained by the addressing module 194 using the new offset value in the first and second rows of the offset column of registers 606 and adding it to the value in the base address register yielding the location of the first bit of item 1000 in the memory 150.

Figure 11:
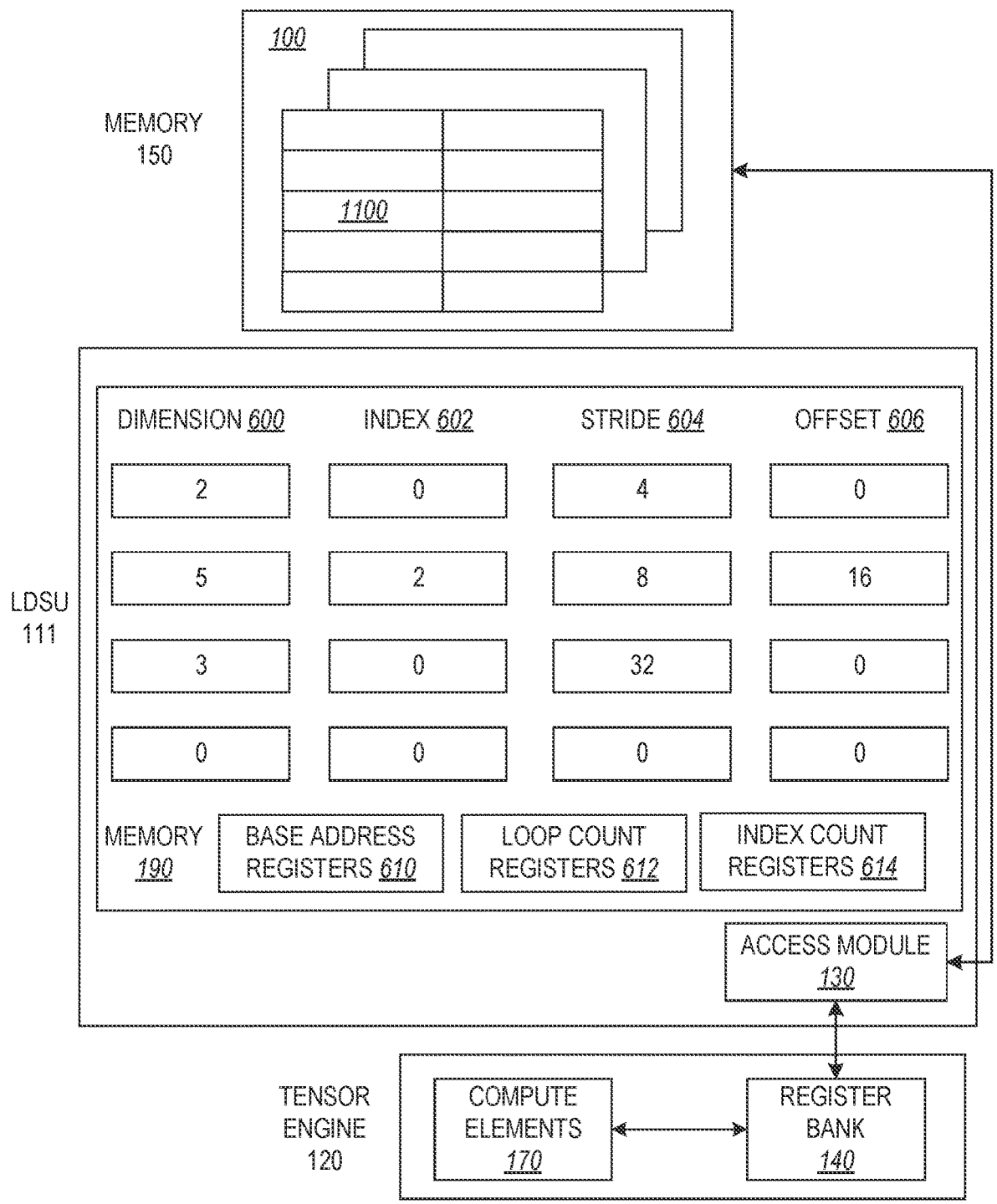
FIG. 11 is a block diagram illustrating details of the operation of an LDSU according to one embodiment.

FIG. 11 shows how memory 190 is modified in order to move LDSU 111 to the next position so item 1100 can be obtained, loaded, stored, read, written, and/or otherwise accessed in memory 150 or register bank 140. At this step, index tracking module 193 can set the first row of the index column of registers 602 to 0 and the second row of the index column of registers 602 to 2. The striding module 196 is called which sets the first-row register in the offset column 606 to 0 and the second-row register in the offset column 606 to 16. This can cause tensor walking module 195 to move the LDSU 111 to the next position corresponding to the new offset value (which is obtained by adding the values in the first-row and second-row registers of the offset column of registers 606). Thereafter, an effective address can be obtained by the addressing module 194 using the new offset value in the first and second rows of the offset column of registers 606 and adding it to the value in the base address register yielding the location of the first bit of item 1100 in the memory 150.

As will be understood by someone having ordinary skill in the art, the process repeats over an arbitrary height, width, channel, and any additional dimensions of any tensor the system walks. Moreover, the system can support any number of tensors and any arbitrary size for the primitive data elements from one bit to BFP-32, for example. Furthermore, the registers in memory 190 of LDSU 111 can be laid out, by a compiler, for example, such that user or the input data is capable of determining the order that the dimensions are walked. In one embodiment, the height dimension can be walked first, and in another embodiment the channel dimension can be walked first, for example. This could provide advantages and/or optimizations for different types of input data sets when used by a system that takes advantage of a tensor engine with LDSU 111. In one embodiment, a layout module 155 can be used which can receive input from the compiler, a user interface, or other system to enable the rows in memory 190 to be traversed in an arbitrary order. It should also be noted that anywhere the present disclosure describes a tensor being obtained from a memory, various embodiments could also obtain the tensor from a register bank in the tensor engine itself, or elsewhere. Moreover, when an effective address is determined, it can be used to load or store a tensor at the determined address.

Figure 12:
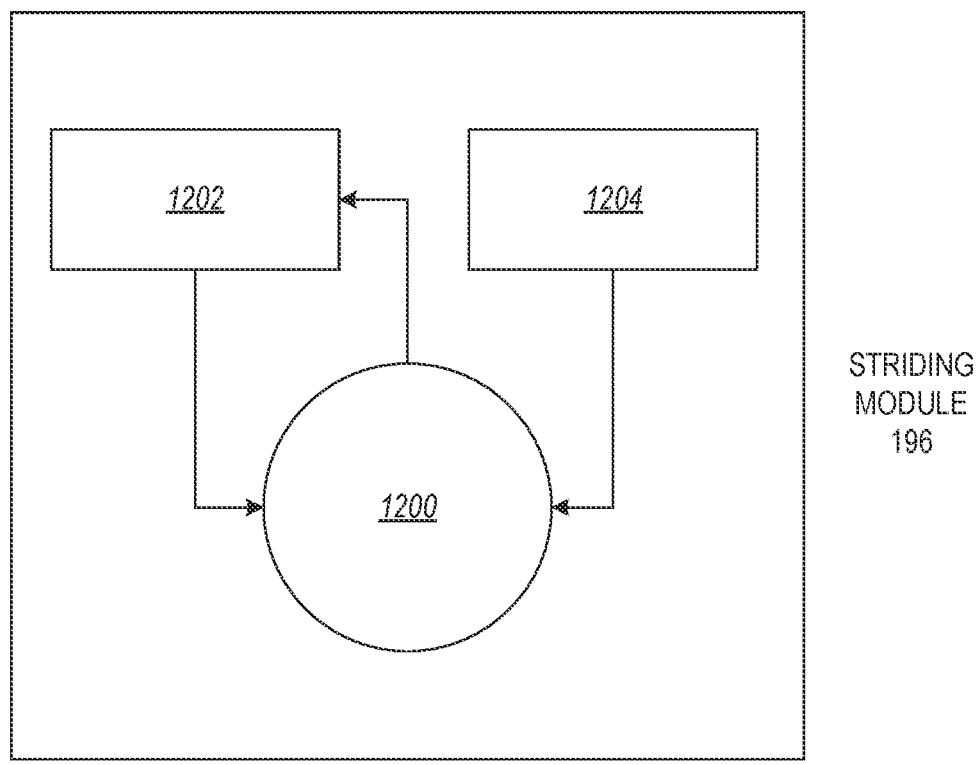
FIG. 12 is a block diagram illustrating details of a striding module according to one embodiment.

FIG. 12 is a block diagram illustrating details of striding module 196 according to one embodiment. Offset register 1202 and stride register 1204 represent an arbitrary row of registers in memory 190 of the LDSU 111. An adder 1200 can be used to add the current offset with the stride each time the LDSU 111 moves to the next position.

Figure 13:
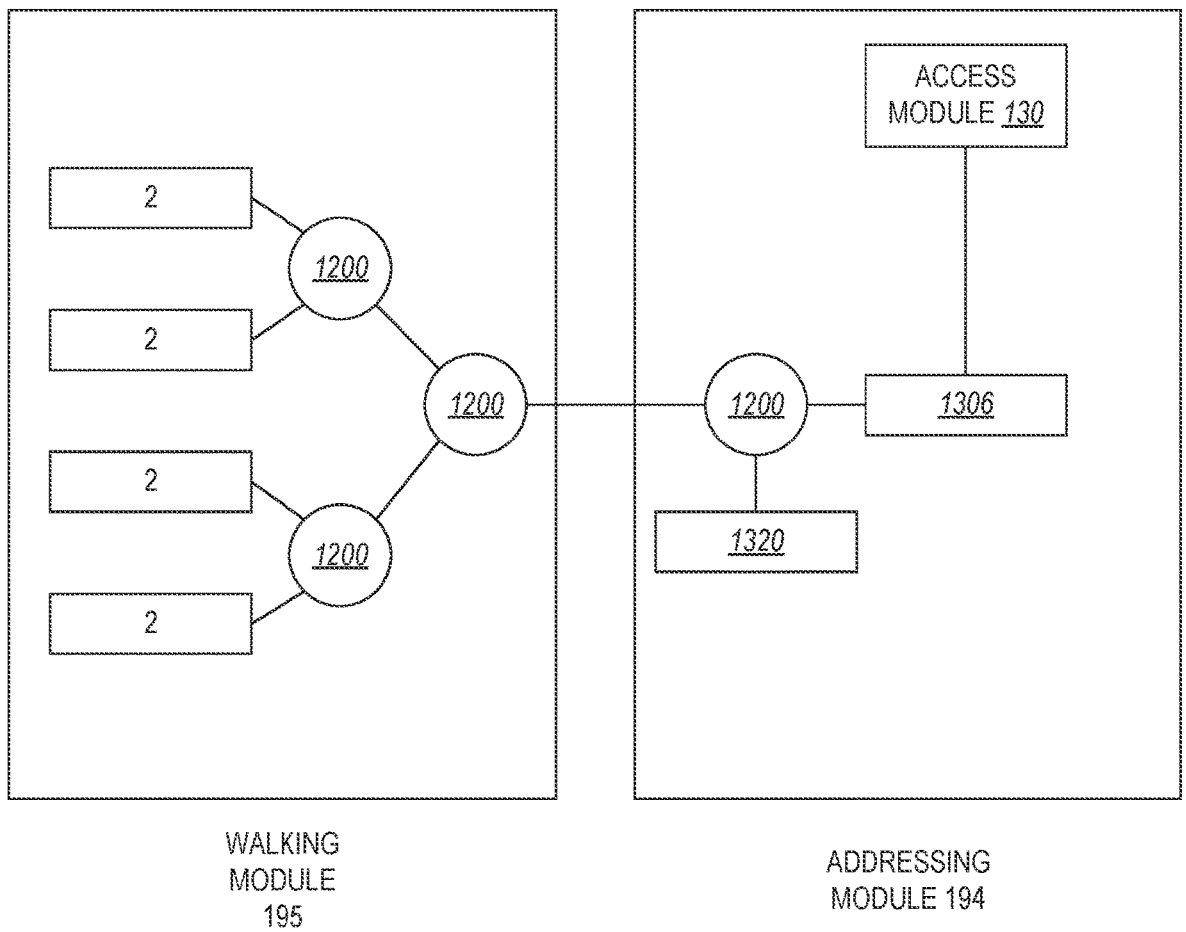
FIG. 13 is a block diagram illustrating details of a walking module according to one embodiment.

FIG. 13 is a block diagram illustrating details of the tensor walking module 195 and the addressing module 194 according to one embodiment. An offset column of registers 1310 in the tensor walking module 195 has current offset values for each dimension of a tensor that is being walked. Adders 1300, 1301, and 1302 are used in this embodiment to combine 4 dimensions together and sum them with a value in a base address register 1320 using adder 1303 in the addressing module 194. The result is placed in an effective address register 1306. The values stored in the effective address register 1306 can be used by the access module 130 to obtain, load, store, read, write, and/or otherwise access either memory 150 or register bank 140 to obtain an item in an n-dimensional tensor.

Figure 14:
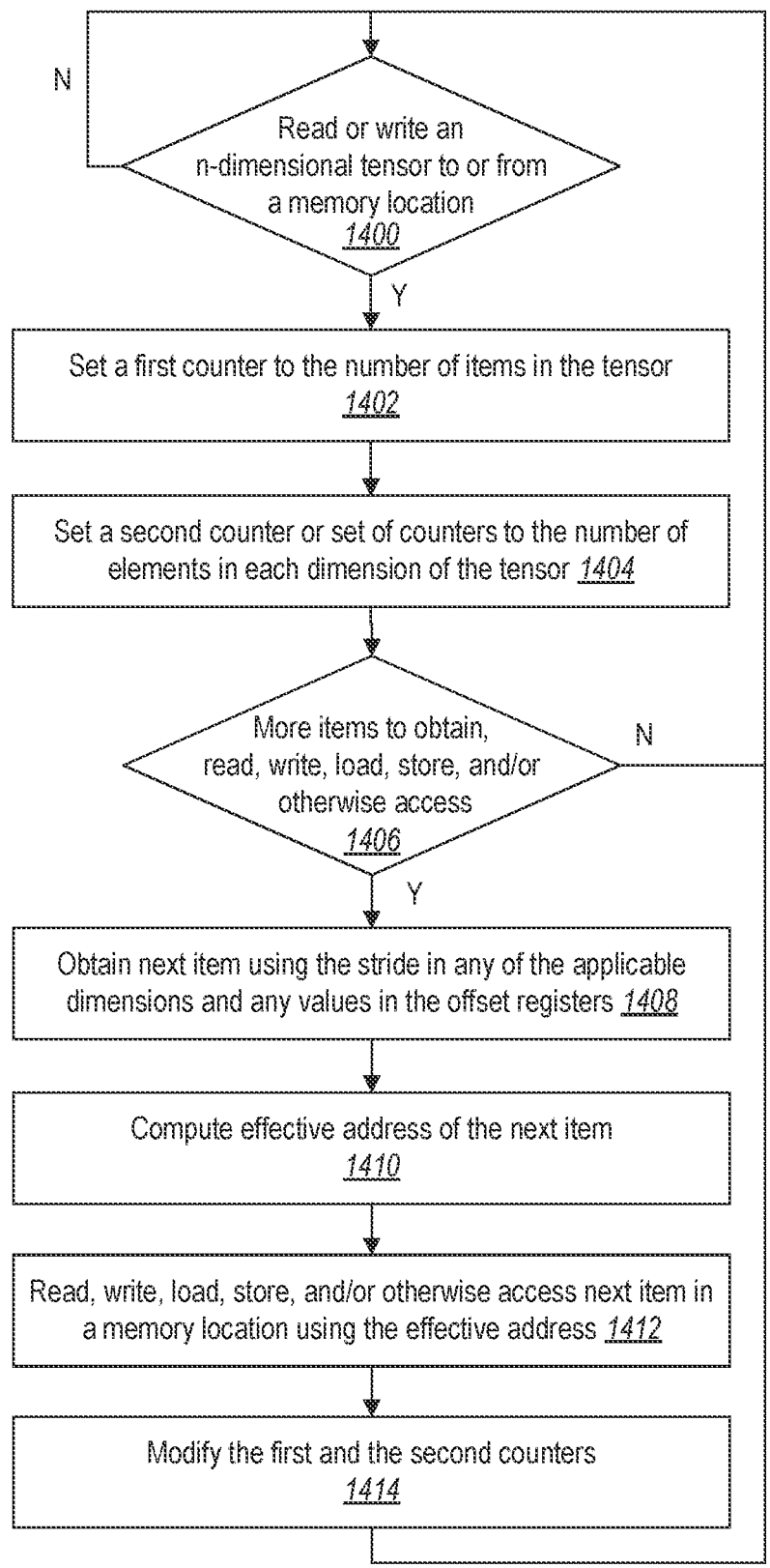
FIG. 14 is a flowchart illustrating the operation of a tensor engine with an LDSU according to one embodiment.

FIG. 14 is a flowchart illustrating the operation of a tensor engine with an LDSU according to one embodiment. At operation 1400, a system, such as an ML accelerator, a general-purpose computing device, or other execution environment determines it needs to read or write an n-dimensional tensor to or from a memory location. At operation 1402, a first counter, such as an item counter, a loop counter, or other variable is set to the number of items in the tensor. This could occur, for example, by taking the product of the number of elements in each dimension of the tensor and storing it in a register. At operation 1404, a second counter, or set of counters, such as an index counter or register, is set to the number of elements in each dimension of the tensor. This could be stored in a plurality of registers in the memory of the LDSU, with at least one register for each dimension of the tensor to store the number of items and current index position in the current dimension, so it can be compared against the number of elements in the dimension. For example, when the number of elements equals the current index position, a system can determine it has reached the last item in a given dimension.

When there are more items at operation 1406 to obtain, read, write, load, store, and/or otherwise access, the tensor can be walked as follows. The next item is obtained at operation 1408 using the stride in any of the applicable dimensions and any values in the offset registers. One embodiment uses a striding module for each axis of the tensor that is being traversed, which enables the system to update offset registers every time the LDSU is moved without needing any nested loop operations. At operation 1410, the effective address of the next item is computed. An address module can be used to add a value in a base register with the current offset values summed from a tensor walking module 195, for instance. At operation 1412, the next item is read, written, loaded, stored, and/or otherwise accessed in a memory location using the effective address. Thereafter, at operation 1414, the first and the second counters are modified.

When there are no more items at operation 1406, the last item in the tensor was reached. Control can return to the main system, ML accelerator, computing device, or other process at operation 1400 that called the LDSU functionality and/or otherwise needed to process a tensor. Operation 1400 repeats until the LDSU functionality needs to be called again and operation 1400 becomes true.

Figure 15:
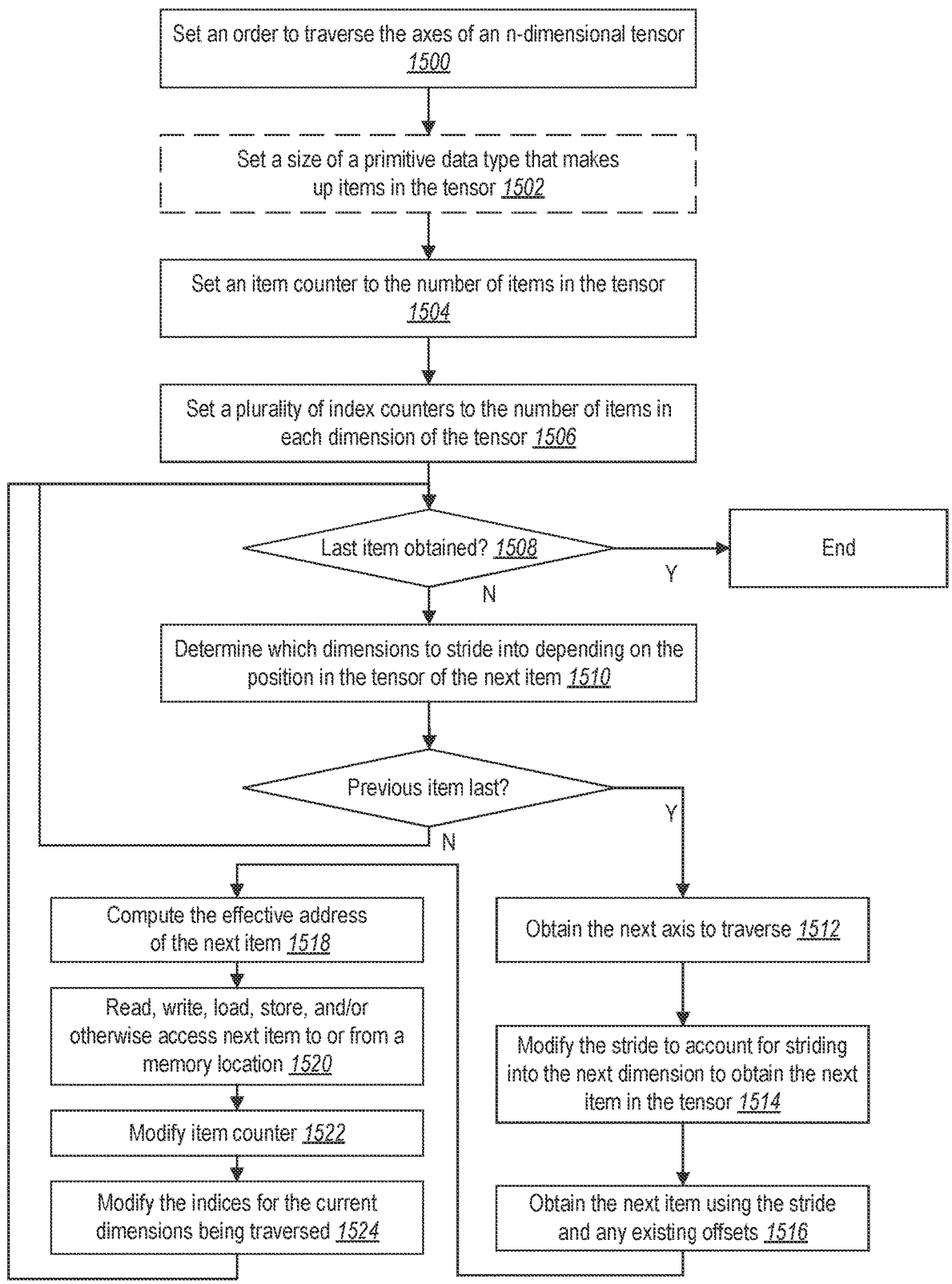
FIG. 15 is a flowchart illustrating the operation of a tensor walking module according to one embodiment.

FIG. 15 is a flowchart illustrating the operation of a tensor walking module according to one embodiment. At operation 1500, an order to traverse the axes of an n-dimensional tensor is set. At operation 1502, an optional operation of setting a size of a primitive data type that makes up items in the tensor. At operation 1504, an item counter is set to the number of items in the tensor. At operation 1506, a plurality of index counters are set to the number of items in each dimension of the tensor. The tensor can be processed one item at a time, in a deterministic fashion, until the last item is obtained. When the last item is obtained at operation 1508, the process ends. Otherwise, there are more items in the tensor, so at operation 1510 the system determines which dimensions to stride into depending on the position in the tensor of the next item. If the previous item was the last item in the current axis at operation 1510, then the next axis to traverse is obtained at operation 1512. At operation 1514, the stride is modified to account for striding into the next dimension to obtain the next item in the tensor.

Thereafter, or if the current item was not the last item at operation 1510, the next item is obtained using the stride and any existing offsets at operation 1516. At operation 1518, the effective address of the next item is computed. At operation 1520, the next item is read, written, loaded, stored, and/or otherwise accessed to or from a memory location such as a memory or a register bank. At operation 1522, the item counter is modified. At operation 1524, the indices for the current dimensions being traversed are modified. The process repeats at operation 1508 until the last item in the tensor is processed.

Figure 16:
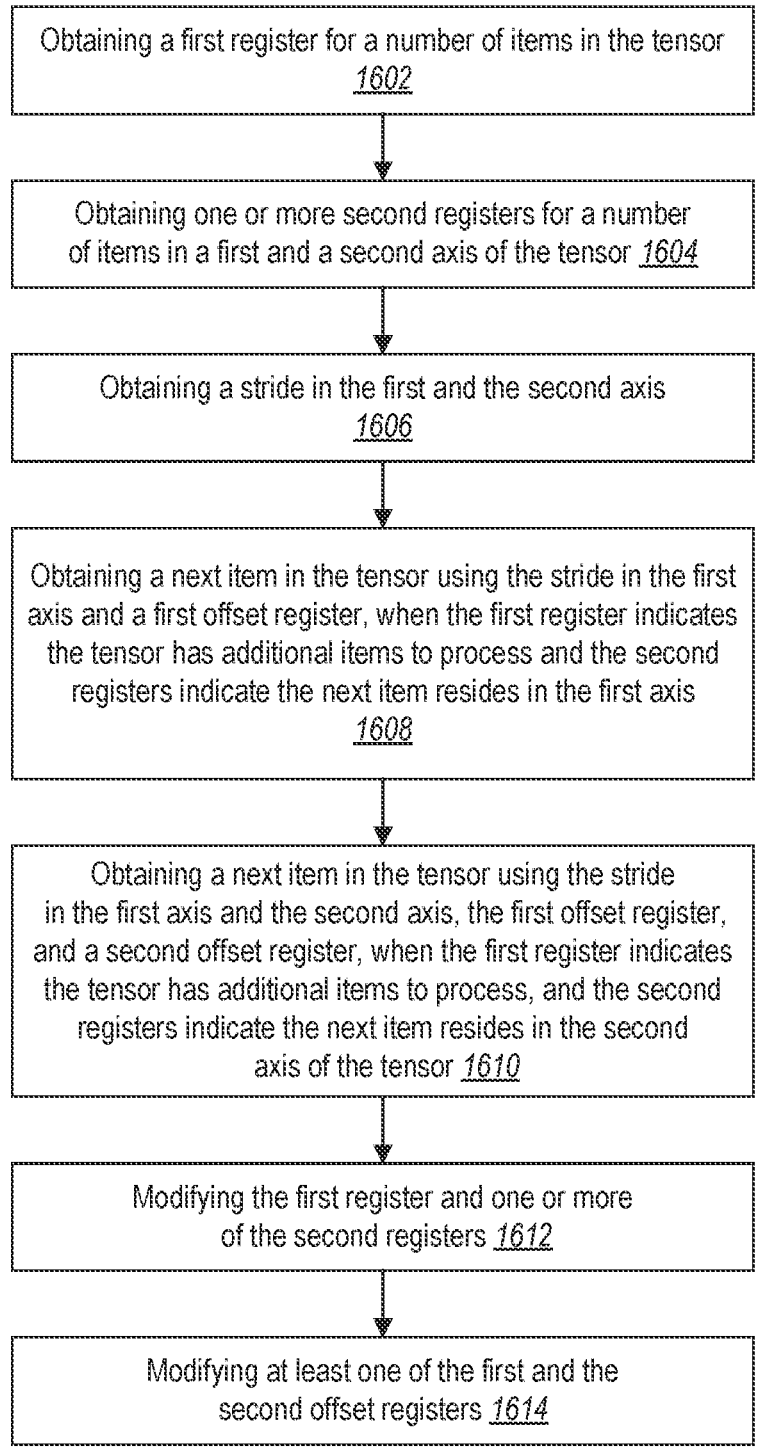
FIG. 16 is a flowchart illustrating the operation of a method for processing a tensor according to one embodiment.

FIG. 16 is a flowchart illustrating the operation of a method 1600 for processing a tensor. At operation 1602, a first register is obtained for a number of items in the tensor. At operation 1604, one or more second registers are obtained for a number of items in a first and a second axis of the tensor. At operation 1606, a stride is obtained in the first and the second axis. At operation 1608, a next item in the tensor is obtained using the stride in the first axis and a first offset register, when the first register indicates the tensor has additional items to process and the second registers indicate the next item resides in the first axis. At operation 1610, a next item in the tensor is obtained using the stride in the first axis and the second axis, the first offset register, and a second offset register, when the first register indicates the tensor has additional items to process, and the second registers indicate the next item resides in the second axis of the tensor. At operation 1612, the first register and one or more of the second registers is modified. At operation 1614, at least one of the first and the second offset registers is modified.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for processing a tensor, comprising:
   obtaining a first register for a number of items in the tensor;
   obtaining one or more second registers for a number of items in a first and a second axis of the tensor;
   obtaining a stride in the first and the second axis;
   obtaining a next item in the tensor using the stride in the first axis and a first offset register, when the first register indicates the tensor has additional items to process and the second registers indicate the next item resides in the first axis;
   obtaining a next item in the tensor using the stride in the first axis and the second axis, the first offset register, and a second offset register, when the first register indicates the tensor has additional items to process, and the second registers indicate the next item resides in the second axis of the tensor;
   modifying the first register and one or more of the second registers; and
   modifying at least one of the first and the second offset registers.

2. The method of claim 1, further comprising determining an effective address of the next item using a base address for the tensor in a memory region and one or more values stored in the first and the second offset registers.

3. The method of claim 2, further comprising reading the next item at the effective address.

4. The method of claim 2, further comprising writing the next item to the effective address.

5. The method of claim 1, wherein obtaining a next item in the tensor in a first axis further comprises determining an order for traversing the tensor.

6. The method of claim 2, wherein determining an effective address of the next item using a base address for the tensor in a memory region and one or more values stored in the first and the second offset registers further comprises:
   setting a channel, a height, or a width as the first axis.

7. The method of claim 1, wherein obtaining a stride uses a primitive data type associated with the tensor.

8. The method of claim 7, wherein the primitive data type is selected from the group consisting of bits, bytes, integers, words, boolean values, (brain floating-point) BF-16, or FP-32.

9. The method of claim 1, wherein modifying the first register and one or more of the second registers includes incrementing or decrementing the first register and one or more of the second registers.

10. The method of claim 1, wherein modifying at least one of the first and the second offset registers includes one or more of adding a first value in the first offset register to the stride in the first axis and adding a second value in the second offset register to the stride in the second axis.

11. A load/store unit (LDSU) for a tensor engine comprising:
    a first register for storing values associated with a number of items in a tensor;
    a plurality of second registers for storing a number of items in a first and a second axis of the tensor;
    a plurality of offset registers associated with the first and the second axis;
    a first and a second stride register associated with the first and the second axis;
    a tensor walking module configured to obtain a next item in the tensor using a first stride register and a first offset register, when the first register indicates the tensor has additional items to process and the second registers indicate the next item resides in the first axis of the tensor,
    the tensor walking module further configured to obtain a next item in the tensor using the first and the second stride registers, the first offset register, and a second offset register, when the first register indicates the tensor has additional items to process, and the second registers indicate the next item resides in the second axis of the tensor;
    an iteration tracking module configured to modify the first and the second registers; and
    a striding module configured to modify at least one of the first offset register or the second offset register.

12. The LDSU of claim 11, comprising an address module configured to determine an effective address of the next item using a base address for the tensor in a memory region and one or more values stored in the first and the second offset registers.

13. The LDSU of claim 12, further comprising an access module is configured to read the next item at the effective address.

14. The LDSU of claim 13, wherein the access module is further configured to write the next item to the effective address.

15. The LDSU of claim 11, further comprising a layout module is used to determine an order for traversing a plurality of dimensions of the tensor.

16. The LDSU of claim 15, wherein a first dimension of the plurality of dimensions is selected from the group consisting of a channel, a height, and a width.

17. The LDSU of claim 11, wherein the striding module uses an item type associated with the tensor to modify the first offset register or the second offset register.

18. The LDSU of claim 17, wherein the item type is selected from the group consisting of bits, bytes, integers, words, boolean values, (brain floating-point) BF-16, or FP-32.

19. The LDSU of claim 11, wherein the iteration tracking module modifies the first and second registers by incrementing or decrementing values in the first and the second registers.

20. The LDSU of claim 11, wherein the striding module modifies at least one of the first offset register or the second offset register by adding a first value in the first offset register to a second value in the first stride register and adding a third value in the second offset register to a fourth value in the second stride register.

\* \* \* \* \*